(12) United States Patent
Rubbia

(10) Patent No.: US 6,876,714 B2
(45) Date of Patent: Apr. 5, 2005

(54) DEVICE FOR HEATING GAS FROM A THIN LAYER OF NUCLEAR FUEL, AND SPACE ENGINE INCORPORATING SUCH DEVICE

(75) Inventor: Carlo Rubbia, 9, chemin des Tulipiers, - 1208 Geneva (CH)

(73) Assignees: Carlo Rubbia (CH); Enea (Ente per le Nuove Tecnologie l'Energie el' Ambiente) (IT)

( * ) Notice: Subject to any disclaimer, the term of this patent is extended or adjusted under 35 U.S.C. 154(b) by 0 days.

(21) Appl. No.: 09/782,558

(22) Filed: Feb. 13, 2001

(65) Prior Publication Data

US 2002/0080907 A1 Jun. 27, 2002

(30) Foreign Application Priority Data

Sep. 28, 2000 (IT) .................................... RM2000A0521

(51) Int. Cl.$^7$ ................................................ G21C 23/00
(52) U.S. Cl. ........................ 376/318; 376/909; 60/203.1
(58) Field of Search ................................ 376/318, 319, 376/414, 202, 203, 383, 909, 455; 60/203.1

(56) References Cited

U.S. PATENT DOCUMENTS

| | | | |
|---|---|---|---|
| 3,110,154 A | * 11/1963 | Edelbaum et al. ........... 60/35.6 |
| 3,202,582 A | 8/1965 | Rom | |
| 3,391,281 A | 7/1968 | Eerkens | |
| 3,778,344 A | * 12/1973 | Walsh ........................ 176/22 |
| 3,799,883 A | * 3/1974 | Arino et al. ................ 252/645 |
| 3,817,029 A | 6/1974 | Frisch | |
| 3,844,972 A | * 10/1974 | Tully et al. ................. 252/639 |
| 3,865,614 A | * 2/1975 | Newbury et al. ........... 427/235 |
| 3,940,318 A | * 2/1976 | Arino et al. ................ 205/48 |
| 3,952,263 A | 4/1976 | McArthur et al. | |
| 3,974,028 A | * 8/1976 | Wheeler ..................... 376/349 |
| 4,759,911 A | * 7/1988 | Bingham et al. ........... 376/428 |
| 5,247,548 A | 9/1993 | Malloy et al. | |
| 5,289,512 A | * 2/1994 | Pettus ........................ 376/318 |
| 5,410,578 A | * 4/1995 | Walton ....................... 376/318 |
| 5,428,653 A | * 6/1995 | El-Genk ..................... 376/318 |
| 5,615,238 A | * 3/1997 | Wiencek et al. ............ 376/202 |
| H1753 H | * 10/1998 | Warren et al. .............. 376/318 |
| 5,873,239 A | * 2/1999 | Culver ....................... 60/203.1 |
| 6,160,862 A | * 12/2000 | Wiencek et al. ............ 376/202 |

OTHER PUBLICATIONS

"Nuclear Thermal Rockets: Next Step to Space", Aerospace America, Jun. 1989, pp. 16–29.
Bussard R W et al., "Nuclear Rocket Propulsion", McGraw-Hill Book Company, New York, 1958.
Nasa Report on Mars Mission, "Human Exploration of Mars: The Reference Mission of the NASA Mars Exploration Study Team", (including Addendum V3.0, Jun. 1998), NASA SP 6107, 1997.
T. Kammash, ed., „Principles of Fusion Energy Itilization in Space Propulsion, AIAA Progress in Astron. and Aeron., vol. 167, AIAA, New York, 1995.

(Continued)

Primary Examiner—Michael J. Carone
Assistant Examiner—Rick Palabrica
(74) Attorney, Agent, or Firm—DLA Piper Rudnick Gray Cary US LLP

(57) ABSTRACT

A gas, e.g. hydrogen, at relatively low pressure is directly heated by the fission fragments (FF) emitted by a thin layer of fissile material, e.g. $^{242m}$Am, deposited on the inner wall of a chamber which is kept cooled at a typical temperature of about 1,000/1,500 K. The gas is preferably emitted as capillary flow from the walls of cylindrical tubes. Its temperature progressively increases until it reaches an equilibrium value of the order of 9,500 K, at which point FF heating and radiative cooling balance. With a relatively modest surface power density at the foil of 200 W/cm$^2$, the specific, volume-averaged power given to the H gas may be as large as 0.66 MWatt/g. Heating powers up to megawatts for each gram of gas are therefore feasible with acceptable foil surface heating. The gas heating method can be used in rocket engines for deep space propulsion.

72 Claims, 24 Drawing Sheets

OTHER PUBLICATIONS

Schulze N R, et al., "The NASA–Lewis Program on Fusion Energy For Space Power and Propulsion, 1958–1978", Fusion Technology, vol. 19, No. 1, pp. 11–28, 1991.

Ragsdale R, et al., "Gas–Core Rocket Reactors—A New Look", AIAA/SAE $7^{th}$ Propulsion Joint Specialist Conference, Salt Lake City, Utah, NASA TM X–67823, 1971.

Clement J D, et al., "Gas–Core Reactor Technology", Reactor Technology, vol. 13, No. 3, 1970.

Howe, et al., "Fission Neutron Multiplicity for / SUP $^{242}m$Am$(n,f)$ Reaction", Nuclear Science and Engineering, Apr. 1981, USA, vol. 77, No. 4, pp. 454–462.

Chikin, et al., "Gas Heating By Fission Fragments in the Channel of a Pulsed Reactor", Atomnaya Energiya, Dec. 1988, USSR, vol. 65, No. 6, pp. 435–437.

Torczynski, et al., << Transient Gas Motion in Nuclear–Reactor–Pumped Lasers: Computational and Experimental Results, Nuclear Science and Engineering, Mar. 1993, USA, vol. 113, No. 3, pp. 189–206.

Montierth, et al., "Energy Deposition in Direct Nuclear Pumped Optical Cavities", Journal of Applied Physics, American Institute of Physics, May 15, 1991, New York, USA, vol. 69, No. 10, pp. 6776–6788.

* cited by examiner

Figure 1.

DEVICE FOR HEATING GAS FROM A THIN LAYER OF NUCLEAR FUEL, AND SPACE ENGINE INCORPORATING SUCH DEVICE

BACKGROUND OF THE INVENTION

The present invention relates to the use of nuclear fission to heat gases. It has applications in the field of deep space rocket propulsion, in particular.

If nuclear energy is presently competing with other methods on Earth, for deep space travel it has unique features which make it practically indispensable in order to realistically attain the long range goals of a manned exploration of Mars, of the outer planets' satellites and of the Asteroids.

Neutron induced fission is the preferred nuclear reaction for practical energy production, because of (1) its remarkable energetic yield (≈200 MeV) and (2) its ability of sustaining the reaction with the secondary neutrons.

The present state of the art of nuclear space propulsion, is represented for instance by the NERVA design (see "Nuclear thermal rockets: next step to space", Aerospace America, June 1989, pages 16–29; or R. W. Bussard, et al. "Nuclear Rocket Propulsion", McGraw-Hill, New York, 1958). In the NERVA design, the energy produced by the fission reaction is recovered in the form of high temperature heat from fuel rods. To ensure the heat flow from the fuel to the propellant gas, the temperature of the propellant gas must be somewhat less than the operating temperature of the fuel, in turn limited by the mechanical strength and the stability of the fuel rods at high temperatures. Furthermore, in order to ensure a good heat transfer to the propellant, the pressure of the high temperature gas must be very high, of the order of 150 bars.

The exhaust velocity $v_{exh}$ of a rocket engine is limited by the enthalpy and the final temperature of the energy-producing reaction, and it is proportional to the so-called specific impulse. The specific impulse is defined as $I_{sp}=v_{exh}/g$, where $g=9.81$ m.s$^{-2}$ is the gravitational constant. It represents the duration over which a given mass of propellant can exercise a thrust force equal to its weight. Chemical rocket engines using liquid hydrogen and oxygen typically operate at exhaust temperatures of 3600° K under stoichiometric conditions, with an effective molecular weight of about A=11, which limits the specific impulse to about 450 s. NERVA type engines perform somewhat better than chemical engines and offer a higher specific impulse of about 950 s. The advantage, however, is mainly due to reductions in the effective molecular weight (the specific impulse is proportional to $1/\sqrt{A}$) due to the use of pure hydrogen gas (A=2 vs. A=11) rather than an increase in the exhaust temperature.

In fact, NERVA rockets are expected to operate at lower temperatures than chemical rockets (3,000° K) due, as already pointed out, to material limitations of the reactor core. The vast amount of energy potentially available through the fission process remains largely untapped due to (1) size constraints associated with the minimum critical mass required to sustain the fission chain reaction and (2) the difficulty of extracting heat at sufficiently high temperatures from the reactor. Notwithstanding, the NERVA engine is often cited as being so far the only realistic engine candidate so far for a manned trip to Mars.

The NERVA engine is basically a naked fast reactor, which represents a serious drawback of nuclear engines for space propulsion. Let us consider for instance the set of three NERVA engines as described in a recent NASA Report on a Mars mission ("Human Exploration of Mars: The Reference Mission of the NASA Mars Exploration Study Team", (including Addendum V3.0, June 1998), NASA SP 6107, 1997). The installed power is near 1 GWatt and about $3.2\times10^{19}$ fast neutrons/s will be expelled from the engines. The standard allowed dose of $\leq 10$ n/cm$^2$/s is attained only at an unshielded distance of 5,000 km.

In addition, the neutron leakage will also hamper the simultaneous operation of several NERVA engines nearby, as in the above-mentioned report. Indeed, a reactor—even if switched off by control bars—is still a sub-critical, multiplying device and it will produce power if irradiated by neutrons from the nearby engines. For instance, if a mere 1% of the neutrons from one engine hit the neighbour unit scrammed at k=0.99, the latter will swing into full power. If it is already on, the additional neutron contribution will be sufficient to bring it to prompt criticality. The coupled control system for mutually interfering reactors is, in our view, a true nightmare and unrealistic in a manned space mission.

For any engine to be used for interplanetary travel, the residual neutron flux outside the engine should be sufficiently low as to permit the operation of the engine not too far from the Space Station (ISS) which is considered as the main "docking point" for the interplanetary journey. In addition, the dose given to the crew should also be small compared to the inevitable dose from the cosmic ray background, which amounts to about 40 rad/y.

The potential features of several nuclear devices for a Space Propulsion engine beyond the potentialities of NERVA have been illustrated by several papers (T. Kammash, ed., "Fusion Energy in Space Propulsion", AIAA Progress in Astron. And Aeron., Vol. 167, AIAA, N.Y., 1995; or N. R. Schulze, "The NASA-LEWIS Program on Fusion Energy for space Power and Propulsion", Fusion Technology, 19-1, pages 11–28, 1991). They are mostly based on Fusion rather than Fission, primarily because this process permits the use of charged reaction products directly to heat up the exhausted gas to high temperatures in the form of a plasma.

Both inertial and magnetically confined Fusion have been extensively explored. The choice of Fusion as a reference has been driven by the obvious argument that the ionising reaction products, which are used to heat-up the propellant, are much easier to extract from a Magnetically Confined (MC) or an Inertial Fusion (IF) device.

However, huge fundamental and technological problems have so far hampered the realisation of a practical Fusion, energy producing device on Earth, and even more so in space. Fusion machines, especially MC, are necessarily very large devices, of very complex technology and hardly adapted to the conditions of a long interplanetary journey.

Another concept of nuclear propulsion, based on fission, is the so-called plasma core propulsion. We mention the coaxial flow system and the nuclear light bulb engines (see R. Ragsdale, et al., <<Gas Core Rocket Reactors—a New Look>>, NASA TM X-67823, 1971 ; and J. D. CLEMENT et al., <<Gas Core Reactor Technology>>, Reactor Technol. 13-3, 1970). In these devices the fissionable material (enriched $^{235}$U) is allowed to heat-up to plasma temperatures, up to 50,000° K, and its radiation is used to heat up the hydrogen gas. This is not a trivial task, since hydrogen and most of the other light gases are optically transparent at temperatures less than about 15,000° K, except to their own radiation (lines).

Typically, a coaxial flow plasma reactor for space propulsion is expected to operate at 6,000 MWatt power, producing $I_{sp}$=4,000 s. The cavity diameter is about 4 m, the pressure ranges from 400 to 600 bars and the total weight is of the order of 500 tons. The critical mass is between 40 to 80 kg of $^{235}$U. It is not clear how such a mass could be brought at start-up from solid to the plasma state.

The nuclear light bulb concept, unlike the coaxial flow system provides for full containment of the fuel within a transparent, internally cooled wall configuration, thereby circumventing the problem of fuel mixing with the propellant with a consequent loss in the exhaust. The fissioning plasma is kept away from the transparent walls by a tangentially injected swirl flow of buffer gas, which is re-circulated, with the Uranium losses recovered and re-circulated in the plasma. Otherwise, the principle of operation is the same as the coaxial flow plasma reactor. Typical data for the nuclear light bulb engine are: power 4,600 MWatt; $I_{sp}$=1,870 s; weight 35 tons, edge of the fuel temperature 5,000° K and pressure 500 bars.

These concepts have been investigated in detail, though no test has been made. It is expected to be a difficult technology, the main concern being the control of the criticality of the Uranium plasma. Indeed a change in the multiplication coefficient of ≦0.7%—if not compensated promptly by the control bars—would lead to a prompt criticality accident. For a thick fissile material and neglecting the effects of the reflector, the critical mass is proportional to the inverse of the squared density. In addition, cross sections and hence the critical mass are functions of the temperature. Furthermore, it is not clear how an effective and safe control system can be realised in view of the rapid motion of the inner core (fissionable plasma and surrounding gas) and the possible emergence of hydro-dynamical instabilities.

An object of the present invention is to propose an alternative way of heating gases by means of nuclear fission reactions, which is suitable for space propulsion applications.

SUMMARY OF THE INVENTION

The invention proposes a gas heating method wherein gas is introduced into at least one chamber having a wall coated with fissile material, and the fissile material is exposed to a neutron flux to induce fission, whereby fission fragments are released into the chamber.

A major part of the fission-induced energy in evolved in the form of kinetic energy of the fission fragments (FF). The fissile coating of the chamber provides an essentially two-dimensional fuel, so that a significant portion of the FF are kicked out of the layer into the volume containing the gas. Hence, the FF kinetic energy is transferred to the gas to heat it very efficiently.

The fission is preferably induced in critical conditions, although sub-critical arrangements could be contemplated too.

The chamber wall is cooled from a rear face thereof with respect to the chamber and the fissile material coating. The cooling medium may be a molten metal such as $^7$Li.

In a typical embodiment, the fissile material coating has a fissile content lower than 10 mg/cm$^2$, preferably in the range from 1 to 3 mg/cm$^2$, providing an optimal compromise between the onset of the fission reaction and the release of the FF.

A preferred fissile isotope for the fissile material coating is $^{242m}$Am. Other usable isotopes are $^{233}$U, $^{235}$U and $^{239}$Pu. The fissile material may be in the form of a carbide.

In order to enhance the neutron efficiency, the chamber, e.g. of tubular shape, is located inside an enclosure surrounded by a neutron reflector comprising, e.g. carbon, beryllium and/or beryllium oxide. Typically, there will be a plurality of chambers arranged in the enclosure surrounded by the neutron reflector for receiving the heated gas. In an advantageous embodiment, the neutron reflector comprises, around the enclosure, a thickness of carbon material of at least 50/d (in cm) and preferably of at least 150/d, where d is the density of the carbon material expressed in g/cm$^3$.

For controlling the fission reaction, the neutron reflector may have cavities for receiving removable neutron-absorbing control rods.

In an application of the method to a rocket engine, the chamber is in communication with an exhaust nozzle through a throat provided in the neutron reflector. The enclosure may have a fuel region where the chamber is located, and a hot gas collecting region between the fuel region and the throat. A cooling medium is then circulated in a circuit having a first portion on a face of the neutron reflector adjacent to the hot gas collecting region and a second portion located in the fuel region and separated from the hot gas collecting region by a partition having an aperture in which an open end of the coated chamber wall is inserted. The coated chamber wall separates the chamber from the second portion of the cooling circuit inside the fuel region.

The wall of the chamber is advantageously made of a porous material, for example a carbon material. The gas can then be introduced through pores of the porous wall material. Such wall is preferably coated with a gas-tight layer (for example titanium carbide) on a rear face thereof with respect to the chamber and the fissile material coating. That layer may also isolate the chamber wall material from the adjacent coolant.

Another aspect of the invention relates to a gas heating device for carrying out the method outlined hereabove. Such device comprising at least one chamber for containing gas having a wall coated with fissile material, and means for exposing the fissile material to a neutron flux to induce fission and the release of fission fragments into the chamber.

A further aspect of the invention relates to a space engine comprising a gas heating device as defined hereabove and means for expelling the heated gas into space to generate thrust.

The direct use of the FF to heat a low molecular weight (typically hydrogen) propellant does not suffer from the energy and material limitations imposed on chemical and NERVA engines. The engine is based on (1) a very hot gas and a cold fuel configuration and (2) a very small amount of nuclear fuel in the form of a very thin (≈3 μm) layer which is very efficiently burnt. A special neutron dynamics is used in order to ensure that even such a ultra-thin fuel layer is sufficient to reach criticality. The ultra high vacuum, necessarily present in space, is used to evacuate part of the produced FF.

The remaining fraction of the FF, not dissipated in the gas, is sufficient to ensure the presence of a sufficient number of delayed neutrons, needed for control if a critical reactor option is chosen.

The very high temperature of the exhausted gas, once transformed by the nozzle into coherent motion in the direction of the thrust, produces exhaust speeds $v_{exh}$ and corresponding specific impulses $I_{sp}$ which are much larger than those of a typical chemical fuel or of a NERVA nuclear engine.

BRIEF DESCRIPTION OF THE DRAWINGS

FIG. 1 is a graph showing the fraction of the FF energy escaping one side of a flat deposit (foil) of fissionable material ($^{242m}$Am). The asymptotic limit of 0.44 for zero thickness, in which half of the FF escape, is one half of the total energy given to the FF by the fission process.

DESCRIPTION OF PREFERRED EMBODIMENTS

1.—Fission Fragment Heating

Figure 2:
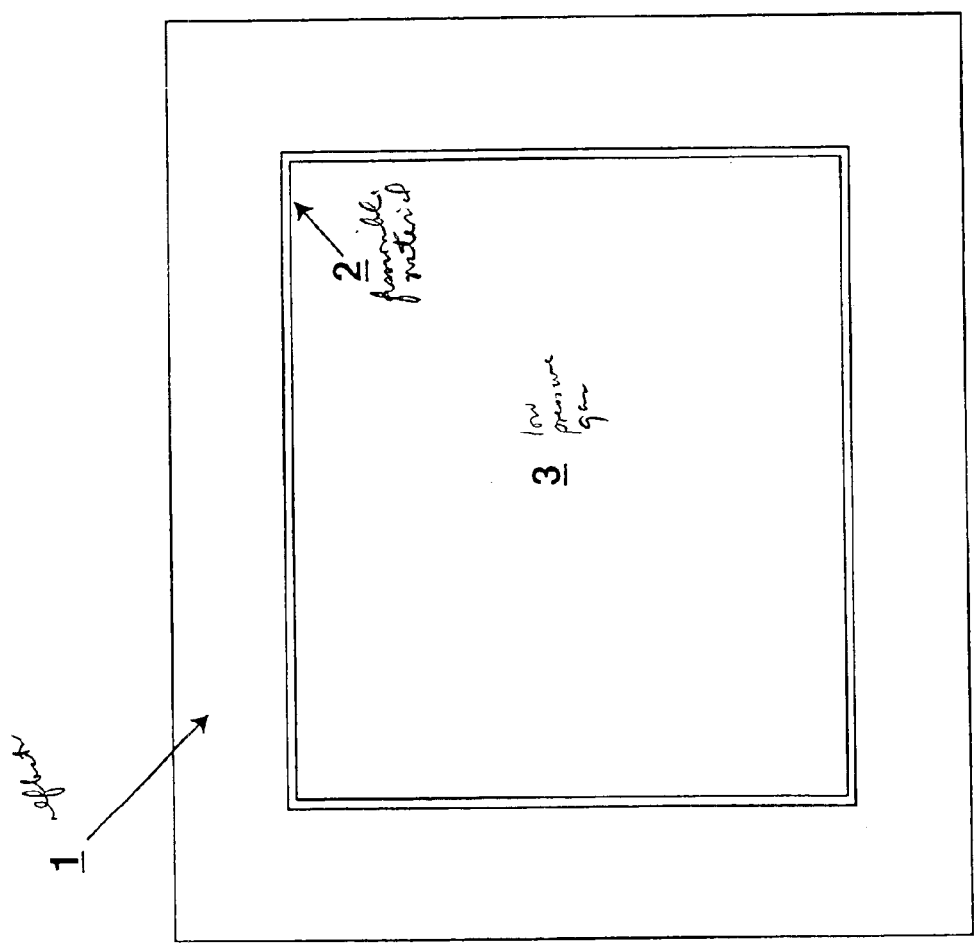
FIG. 2 shows a schematic layout used for calculations. A hollow neutron reflector 1 with coated thin, uniform deposit of fissionable material 2, surrounds a volume 3 filled with low pressure gas and in which FF emitted by the foil are propagating and eventually coming to rest.

The well known neutron induced fission reaction is the preferred source of nuclear energy because of its high energy yield and its ability of sustaining a chain reaction based on neutrons. In this reaction, the initial nucleus is split into two fission fragments (FF) and a number of neutrons (≧2) which are necessary to continue the chain reaction. The average energy sharing in a typical fission reaction is such that a major proportion—namely 168 MeV/191 MeV=88%—of the usable energy (neutrinos are excluded) is produced in the form of kinetic energy by the pair of FF. The fragments of father nucleus being split away beyond the range of the (attractive) nuclear forces, energy is produced by the strong electrostatic repulsion between the two fragments—the rest being de-excitation of the nuclear levels with gamma and neutron emission, possibly followed by β de-excitation.

FF travel a very short way in the fissionable fuel, delivering energy in the form of heat in the immediate vicinity of the father nucleus, with an extremely high specific ionization losses due to their large charge. The longest range of each of the two FF being typically $\leq 10\,\mu m$ in a metallic fuel, such a strongly localized energy deposition is generally not directly accessible and the high specific heat deposition of the FF is diluted by thermal conductivity within the bulk mass of the fuel.

A method for a practical, direct utilisation of the FF kinetic energy escaping a thin, fissionable layer deposited on a foil is disclosed herein, in the framework of a critical (or possibly also a sub-critical) fission driven nuclear reactor. This energy is dissipated in the neighbouring gas medium, for instance hydrogen or other propellant gas which is powerfully heated, typically up to a vicinity of 10,000° K.

The most direct applications of this method is rocket propulsion for space-born missions. Therefore the engine is generally intended to be operated in interplanetary vacuum. The ultra high vacuum, necessarily present in space, is used to evacuate with the gas also the FF which escape from the foil. The rest of the FF remain generally implanted in the foil, although, with time, some additional fraction may also be later evaporated and lost in space.

Compared to chemical propulsion engines which are running at high thrust for a relatively short time, this method, like ionic propulsion, produces a continuous but low intensity thrust, suitable to long journeys in deep space. However it is potentially much more powerful than ionic propulsion, since thrust powers of many MWatt may be readily produced. A large scale engine, appropriate to manned interplanetary journeys, can be envisaged. The engine structure, based on a very hot gas and a cold fuel configuration, is relatively simple, with few functional components; there are no fast moving large elements and it is of easy and flexible operation.

Such high temperature is transformed by the nozzle into a jet of atomic hydrogen of high speed, namely a specific impulse $I_{sp} \approx 2,000$ s, much larger than $I_{sp} \leq 430$ s of the best chemical engines. A required final rocket speed can be achieved with a substantially smaller mass of propellant, which in turn extends the potential range of the journey or, alternatively, shortens its duration.

2.—Achieving Criticality

Figure 1:
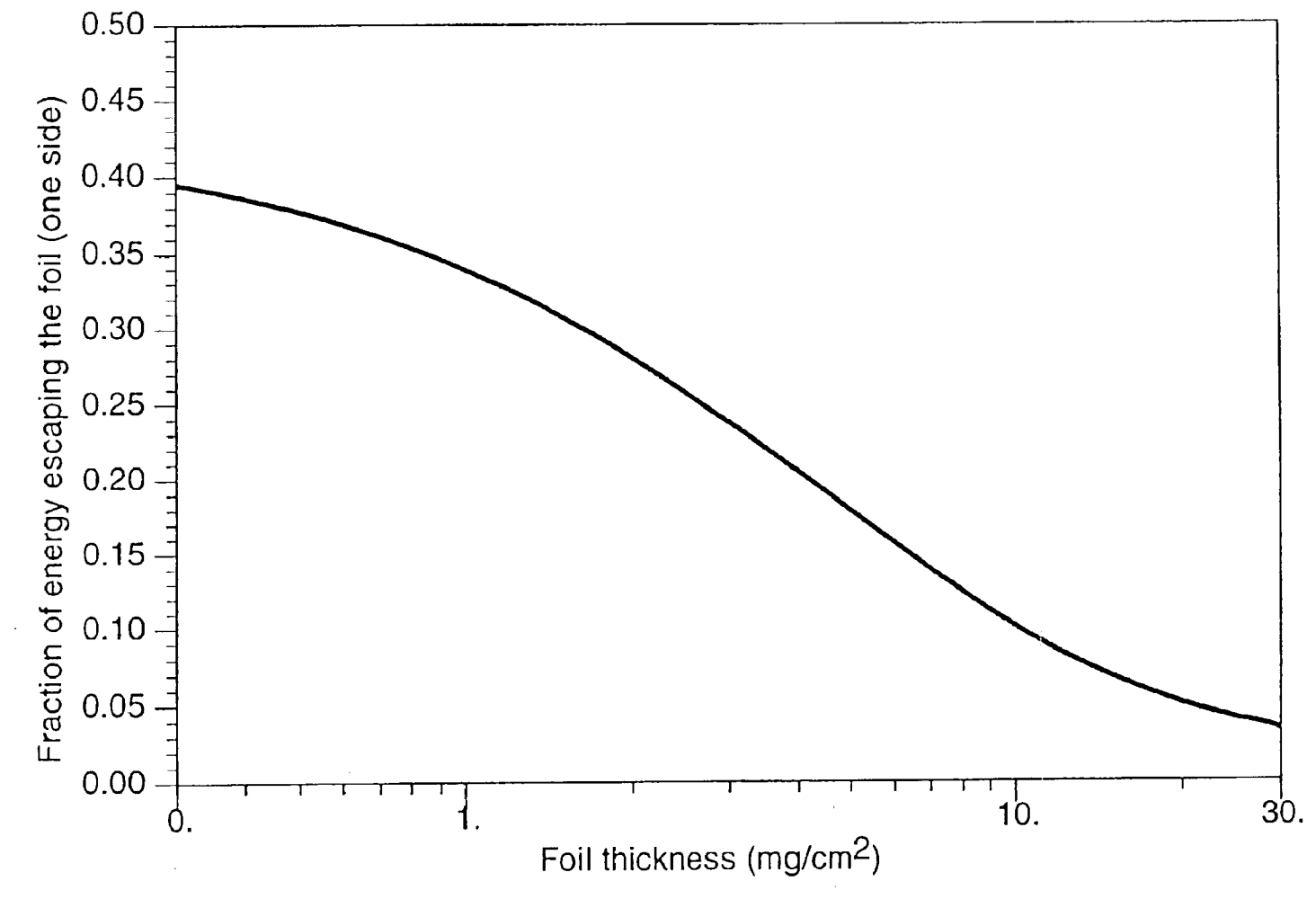

In order to let FF exit efficiently the fuel material, the fissionable material must be in the form of a very thin (a few mg/cm$^2$) deposit, either in metallic or otherwise chemical compound form. The FF being emitted at random direction and uniformly along the thickness of the layer, the fraction of the FF kinetic energy carried out of the deposit is shown in FIG. 1. In the figure we display the fraction of the total nuclear energy produced inside the layer which escapes in the form of kinetic energy of the FF. It is apparent that the energy extraction efficiency is a fast decreasing function of the layer thickness. Layer thickness of the order of 1÷3 mg/cm$^2$ are appropriate compromise between layer thickness and good FF energy transfer out of the deposit.

A thickness of 1 mg/cm$^2$ corresponds to about 1,100 atomic layers of fissile material (e.g. $^{242m}$Am) or a mere 10 gram deposit over a square meter. How can we get criticality with such highly diluted fissile material? For instance a (thermal) neutron traversing normally such a layer, using the most favourable element $^{242m}$Am, for which $\sigma_{fiss} \approx 5,300$ barn, the interaction probability is a mere 1.31%. For other, more common elements, like for instance $^{235}$U, $^{233}$U or $^{239}$Pu this interaction probability is more than a factor 10 smaller (see Table 1). Many, successive neutron traversals of the fissile layer are therefore required. In the present invention, this is achieved with an appropriate configuration of (thin) fuel layers inside a very effective neutron reflector.

TABLE 1

Some cross sections at 0.15 eV for relevant fuel elements.

| | Capture (barn) | Fission (barn) | $\frac{\sigma_{capt}}{\sigma_{capt} + \sigma_{fiss}}$ | Daughter nucleus | Daught. Capture (barn) |
|---|---|---|---|---|---|
| $^{233}$U | 27.91 | 215.97 | 0.11 | $^{234}$U | 36.71 |
| $^{235}$U | 34.45 | 207.51 | 0.14 | $^{236}$U | 2.19 |
| $^{239}$Pu | 310.34 | 535.24 | 0.37 | $^{240}$Pu | 150.60 |
| $^{242m}$Am | 1098.89 | 5248.15 | 0.17 | $^{243}$Am | 34.51 |

Let us consider first an idealised configuration of a cavity, in which some fuel is introduced inside a surrounding thick, neutron reflecting material. Neutrons will "ping-pong" inside the cavity between the reflecting walls and traverse many times the thin, fuel loaded foils. Neutrons acquire a larger fission probability. Criticality is ensured since the newly fission produced neutrons continue the process.

Since the attenuation probability at each cavity crossing is small, the flux inside the cavity will be approximately uniform. Therefore the interaction probability per unit fuel mass will be independent on the actual spatial configuration of the fuel inside the device. For computational purposes and in a first approximation we can therefore assume that (FIG. 2) inside the reflector 1 the fuel layer 2 is uniformly distributed over the inner walls of the cavity 3. This may be merely a computational artefact. In practice the inner structure may consist of several cylindrical units with a thin fissile layer deposited on the inner walls.

After a fast slowdown process in the reflector, the average (fission produced) neutron kinetic energy will quickly approach the thermal energy at the temperature of the reflector. A simple calculation based on diffusion theory for thermalised neutrons shows that, for the idealized fuel configuration, the flux in the presence of the (infinite) reflector is enhanced with respect with the one without reflector approximately by the factor $$F = \frac{1}{\kappa D} = \sqrt{\frac{3\Sigma\,ela}{\Sigma\,capt}}$$

where $\Sigma_{ela}$, $\Sigma_{capt}$ are respectively the elastic and capture cross sections of the diffusing material. Some candidate elements are listed in Table 2. Low A elements have been chosen, since they ensure a fast thermalization of the fission produced neutrons. The quantity $D = \Sigma_{ela}/3$ is the so-called diffusion coefficient and $$1/L = \kappa = \sqrt{\Sigma_{capt}}/D$$

is the diffusion parameter. More complicated chemical compounds, containing elements with small neutron capture macroscopic cross sections can also be used. We note that oxygen has such properties: for instance the properties of the BeO are very close to the one of metallic Beryllium.

TABLE 2

List of some elements of relevance as a reflector.

| Material | Density (g/cm³) | L = 1/κ (cm) | D (cm) | $\sqrt{\langle r^2 \rangle}$ (cm) | $F = \sqrt{\dfrac{3\sigma_x}{\sigma_a}}$ |
|---|---|---|---|---|---|
| Liq. H | 0.07 | 9.76 | 0.65 | 3.98 | 26.14 |
| Liq D | 0.14 | 2425.63 | 12.15 | 990.26 | 244.53 |
| $7_{Li}$ | 0.534 | 84.75 | 7.26 | 34.60 | 12.27 |
| Beryllium | 1.84 | 31.12 | 0.44 | 12.70 | 73.58 |
| Carbon | 1.90 | 66.59 | 0.72 | 27.19 | 94.78 |

A finite reflector thickness will give a smaller F, the fallout of the flux in the reflector being roughly exponential with characteristic length L. Therefore L represents the reference unit for the required thickness of the reflector. We conclude that Be(BeO) and C represent interesting candidates; Li is too transparent (D too large) and F is too small; Deuterium has L too large. With Be(BeO) and C very substantial enhancement factors are possible.

Figure 3:
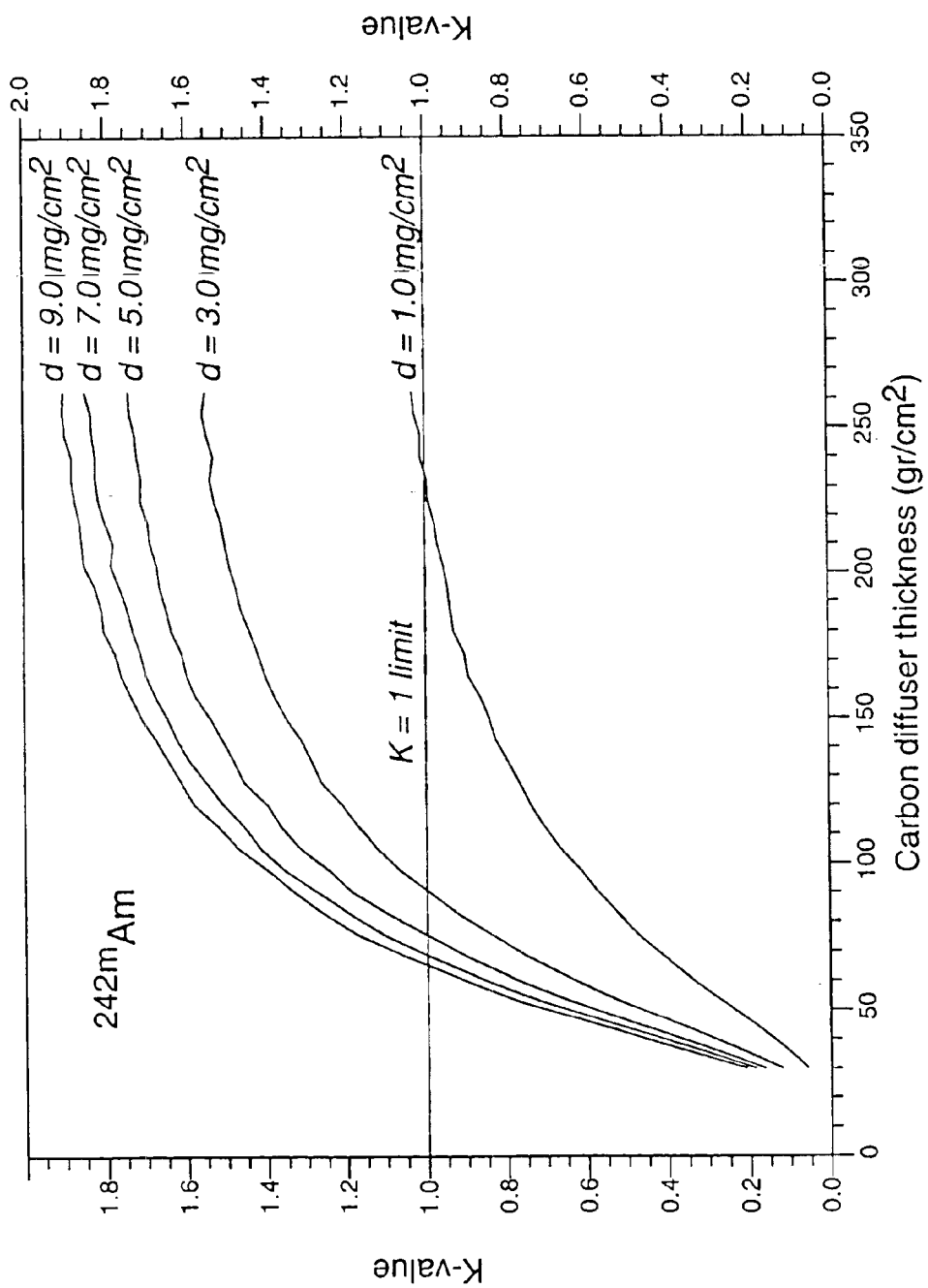
FIG. 3 is a graph showing the multiplication coefficient k for simplified geometry of a single layer on a spherical reflector as a function of the thickness of the reflector layer and of the deposit of fissile $^{242m}$Am.

The actual neutron multiplication parameter k (k=1 for criticality) as a function of the equivalent single $^{242m}$Am layer and Carbon reflector thickness have been calculated with Monte-Carlo methods and shown in FIG. 3. Control rods should be added, inserted in the reflector in order to control the neutron multiplication and to keep it near 1 at all times, avoiding prompt criticality, as in an ordinary power reactor.

The choice of the fuel element is strongly related to the requirement of criticality. We list in Table 1 some of the relevant parameters for possible fuel candidates at the average neutron energy of 0.15 eV, corresponding to a reflector temperature of 1,500° K.

Figure 4:
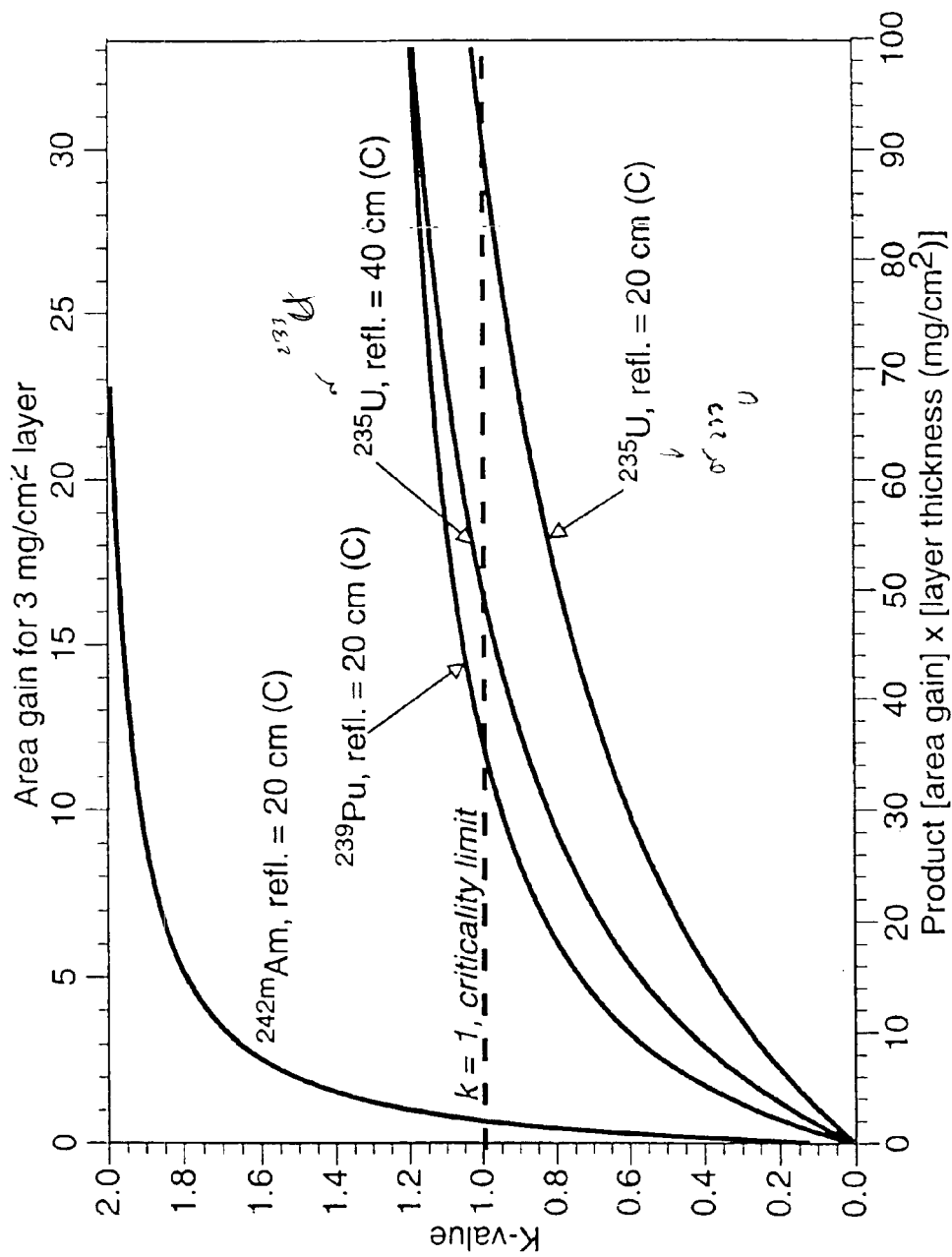
FIG. 4 is a graph showing the multiplication coefficient k, calculated in the simple diffusion theory, for different fissile elements and carbon reflector thickness of 20 cm and 40 cm (density: 1.9 g/cm$^3$), as a function of the product [area gain, $G_{area}$]×[layer thickness (mg/cm$^2$)], simply proportional to the total amount of fuel in the cavity. Cross sections are evaluated at 0.15 eV. Results for $^{233}$U are very close to the ones of $^{235}$U and have not been displayed for clarity.

As already pointed out, the actual engine structure will consist of a configuration of several layers, with a fuelled surface substantially larger than the one of the single layer on the inner walls of the reflector. The ratio of these two areas is indicated as the multiplicative area gain $G_{area}$ of the actual configuration with respect to the simple layer configuration. In FIG. 4 we display the multiplication coefficient k, calculated in the simple diffusion theory, for different fissile elements and C reflector thickness of 20 cm and 40 cm (density: 1.9 g/cm³), as a function of the product [area gain, $G_{area}$]×[layer thickness (mg/cm²)], simply proportional to the total amount of fuel in the cavity. Cross sections are evaluated at 0.15 eV. Results for $^{233}$U are very close to the ones of $^{235}$U and have not been displayed for clarity.

We remark that $^{242m}$Am is an outstanding case, but it is also possible to bring to criticality both $^{239}$Pu and $^{235}$U ($^{233}$U). However in the case of $^{235}$U the reflector thickness has to be augmented substantially. In general, the choice of less performing fuels implies a more massive reflector, in order to compensate for the reduced performance.

The nuclear properties of $^{242m}$Am($t_{1/2}$=141 y) are briefly summarized, having in mind the likely destination of the described engine, i.e. propulsion in space. The main decay mode (99.95%) is a transition to the ground state $^{242}$Am($t_{1/2}$=16.01 h) by internal conversion with the emission of a soft electron (40.3 keV), the rest being β-decay. The daughter nucleus decays 17.3% into $^{242}$Pu(t½=3.76×10⁵ y) and 82.7% into $^{242}$Cm ($t_{1/2}$=162.9 d), which in turn by α-decays transforms into $^{238}$Pu($t_{1/2}$=87.72 y).

The ingestive radio-toxicity of $^{242m}$Am and its decay products is about one half of the one of $^{238}$Pu, for equal masses and during the first hundred years. Therefore potential environmental risks in using either of these elements in comparable amounts are quite similar. This last element is already well known in space applications, since it has been used as an energy source for instance in Voyager, Cassini and other missions.

A long burn-up of the fuel (defined as the total visible energy which can be produced by a unit fuel element mass) requires that the ratio $\sigma_{capt}/(\sigma_{capt}+\sigma_{fiss})$ should be as small as possible, in order to avoid an exaggerated production of the daughters elements by the reaction (A, Z)÷n→(A+1, Z)÷γ, which in turn may subtract neutrons with captures. In addition, for a given fissile mass, the useful burn-up scales also like $\sigma_{capt}/(\sigma_{capt}+\sigma_{fiss})$ since the capture channel produces no appreciable energy.

It is evident from Table 1 that while $^{235}$U and $^{233}$U have excellent nuclear characteristics, very similar to the ones of $^{242m}$Am, the fractional capture cross section of $^{239}$Pu is much higher and it leads to a daughter nucleus which has also a large capture cross section. Therefore a substantially shorter burn-up has to be expected. In view of the low radio-toxicity and of the excellent fission properties, $^{235}$U, is also a possible substitute for $^{242m}$Am although it may require a heavier reflector.

The actual configuration of the reflector has to be calculated for each specific case. However there is no doubt that configurations can be found following the proposed method, in which such a thin fuel layer can lead to criticality.

3.—The General Layout of the Heating Region

Figure 5:
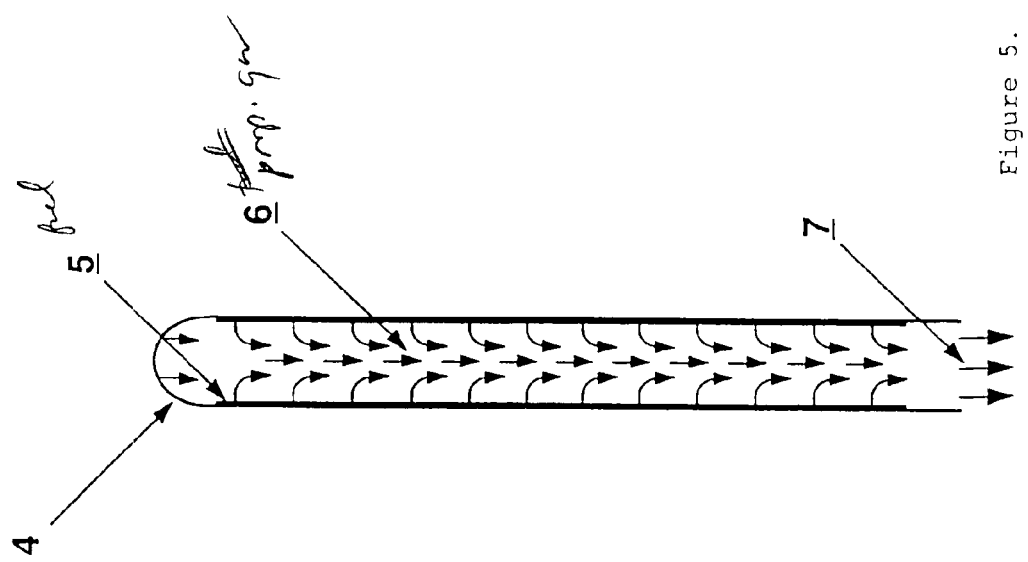
FIG. 5 is a schematic cross-sectional view of a hollow tube of small diameter 4 internally coated with a thin fuel deposit 5. The propellant gas is flowing out of the walls through pores or small holes, with the flow schematically indicated by the small arrows 6 and it exits through the open end of the tube 7. The pressure of the gas is maintained to a prescribed value in the tube by the back pressure acting on 7 and dynamically generated by the nozzle throat.

An optimisation of the use of space inside the moderator's cavity suggests a very large number of hollow tubes of small diameter with an inside coating of fissile material, schematically shown in FIG. 5. Each cylindrical tube 4 is internally coated by a thin fuel deposit 5. As better illustrated later on, the propellant gas is flowing out of the walls through pores or small holes, with the flow schematically indicated by the small arrows 6 and it exits through the open end of the tube 7. The pressure of the gas is maintained to a prescribed value in the tube by the back pressure acting on 7 and dynamically generated by the nozzle throat, namely the small aperture through which the gas exhausts into space.

Assume next for illustration a cylindrical geometry in which the volume inside the hollow reflector is filled with a compact array of many these small diameter tubes and a packing fraction f<1, defined as the fraction of the volume occupied by the tubs. The ratio of surfaces of the single cylinder and of the assembly of the n cylinders inside is roughly $$G_{area} = \frac{\text{Surface many}(n)}{\text{Surface single}} \approx \sqrt{nf}$$

These tubular elements are somehow the analogue of the fuel rods in a ordinary reactor. There is no reason why n should not be truly large, as long as the mechanical structure of each tube is kept simple. Just like in the case of a reactor, a cooling fluid can be circulated between these tubes. Following this analogy, rod cooling can be performed either with a liquid or with a gas. However gas cooling, in order to be efficient, requires high pressures and large circulating volumes. Therefore a liquid coolant is preferable, possibly in a "biphase" (boiling) mode. In view of the high temperature required to dissipate heat in space, the preferred choice is a light molten metal, for instance Lithium ($^7$Li), already used in nuclear space applications and which has the excellent neutronic properties illustrated in Table 2.

A first order exemplification of the multiple-tube configuration may be based on the following, sketchy geometry:

3.1.1) We assume that the reflector has a cylindrical inner volume with a height h equal to the diameter (h=2R): this configuration ensures optimal neutron containment, since it maximises the volume over inner surface ratio.

3.1.2) The inside of the volume is filled with a compact array of n tubes with f=0.7. The tubes have a height equal to h and a radius r. It is easy to show that n≈fR$^2$/r$^2$.

Figure 6:
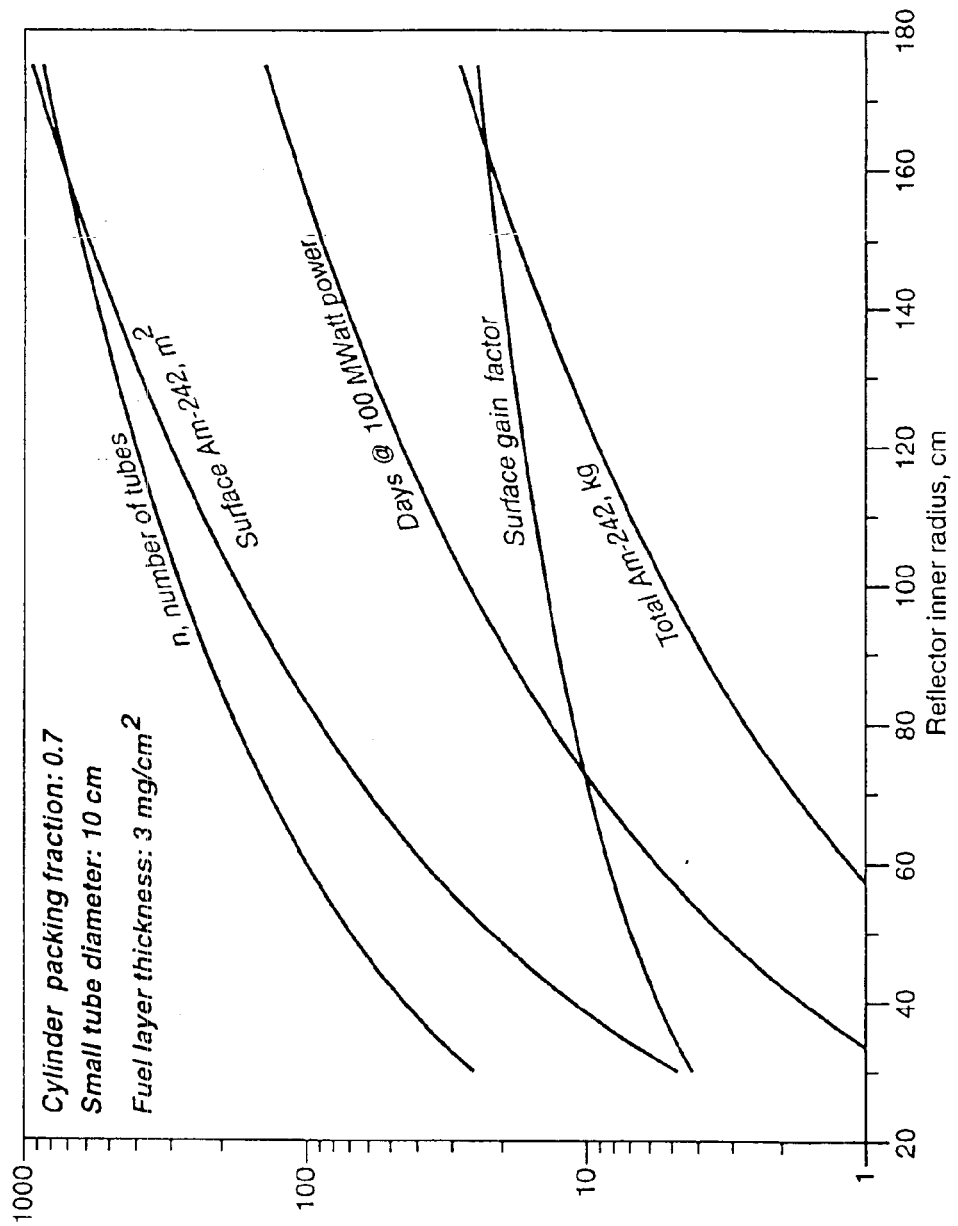
FIG. 6 is a graph showing the dependence of the main parameters of a multiple-tube configuration as a function of the dimension of the reflector's inner radius (2R=h). The packing fraction is assumed to be f=0.7.

We show in FIG. 6 the variation of the main parameters as a function of the reflector inner size, R. For clarity, we have set the tube diameter to a realistic value, 2r=10 cm. The resulting number of tubes is quite large: from n=100 for R=60 cm they grow to n=400 for R=120 cm, with a R$^2$ dependence. The surface of the fuel layer goes from 38 m$^2$ for R=60 to 304 m$^2$ for R=120 cm, with a R$^2$h∝R$^3$ dependence. Similar, fast dependence is obviously to be expected for the mass of fuel and the consequent number of days of burn-up at a given delivered power.

Particularly significant is the surface multiplication factor, as much as $G_{area}$=8.4 and $G_{area}$=16.8 for the two indicated values of R, growing linearly with R. Some parameter lists are given in Table 3.

TABLE 3

Typical multiple-tube arrangements

|  | A | B | C |  |
|---|---|---|---|---|
| Radius cavity | 100.0 | 125.0 | 150.0 | cm |
| Length tubes | 200.0 | 250.0 | 300.0 | cm |
| Radius tube | 5.0 | 5.0 | 5.0 | cm |
| Gas pressure | 15.0 | 15.0 | 15.0 | bar |
| Number of tubes | 280.0 | 438.0 | 630.0 |  |
| Surface Fuel layer | 175.9 | 343.6 | 593.8 | m$^2$ |
| Area gain over single tube | 14.0 | 17.5 | 21.0 |  |
| Fuel mass @ 1 mg/cm$^2$ | 1.8 | 3.4 | 5.9 | kg |
| Fuel mass @ 3 mg/cm$^2$ | 5.3 | 10.3 | 17.8 | kg |
| Delivered energy @ 3 mg/cm$^2$ | 2638.9 | 5154.2 | 8906.4 | MWatt × day |
| Fuel duration @ 100 MWatt | 26.4 | 51.5 | 89.1 | days |

Such a large area gain $G_{area}$ over a single layer, typically as much as one order of magnitude, can be exploited in two different ways:

3.1.3) to reduce the fuel layer thickness and to improve correspondingly the efficiency of FF extraction. For instance the fraction of the energy extracted from the foil by the FF grows from 23.8% at 3 mg/cm$^2$ to 33.9% at 1 mg/cm$^2$ and up to 44% for a nearly zero thickness foil.

3.1.4) To increase the amount of fissile material for a given foil thickness and to extend the burn-up length between refuelling.

3.1.5) To allow the use of less readily fissionable fuels, like for instance $^{235}$U, $^{233}$U or $^{239}$Pu.

A more precise choice of these parameters is obviously determined by the specific requirements of the mission to be performed.

The fuel configuration needed to exploit efficiently the FF kinetic energy is rather unconventional and it is necessary to discuss it in more detail some relevant questions. We shall concentrate on Am$^{242m}$. We recall that the "second best" from the neutron multiplication point of view would be Pu$^{239}$. Also $^{233}$U or $^{235}$U could be used with appropriate enhancement of the reflector performance and at larger area gain $G_{area}$. Similar considerations apply for all these elements.

The chemical form of the fuel deposit deserves special attention in order to ensure the longest survival time. The main relevant effects on the layer are the presence (1) of the gas to be heated and (2) of the radiation damage due to neutrons and FF. The consideration (1) is of course dependent on the type of gas we wish to heat up. Let us consider first the case in which the propellant gas to be heated is hydrogen, of excellent rocket performance:

3.1.6) The Americium carbide Am$_2$C$_3$ has been proven to be strongly resilient in the presence of hydrogen and it is recommended for application with this gas, up to temperatures in excess of 1,500° C.

3.1.7) Particularly interesting are tertiary compounds, like for instance the U—Zr—Nb carbide which has already been used in the NERVA-NASA nuclear propulsion, gas reactor. The U—Zr—Nb carbide has operated in NERVA without appreciable damage over several hours in an atmosphere of hot hydrogen (3000° K) at high pressure (150 bars). Although we have now a thin layer rather than a bulk material, this technology appears safe, especially if one takes into account that in our conditions, temperature and pressure are far less extreme. The substitution of the Uranium with Americium (Am—Zr—Nb carbide) or possibly Plutonium (Pu—Zr—Nb carbide) is possible without additional problems, leading to compounds with properties very similar to the ones of the U—Zr—Nb carbide.

Use of other gases may change the requirements on the chemical composition of the layer. For instance, in addition to the two compounds 3.1.6) and 3.1.7), also other compounds can be used in the case of an inert noble gas, like Helium, Argon, etc.:

3.1.8) a pure Americium metallic deposit: density 13.67 g/cm$^3$, melting point of 1,176° C. and boiling point of 2,011° C. This chemical form is unsuited to the presence of hydrogen gas, because of the possible formation of an hydride compound of the type AmH$_2$ and AmH$_3$. Note that the Am metal could be also in the form of a thin "wet" (liquid) layer at high temperature.

3.1.9) The Americium oxide AmO$_2$ is the most stable of the oxides and with high melting point. But in the presence of (strongly reducing) hot hydrogen it is likely to decompose into metal and therefore as in case 3.1.8), it is only suitable to heat non reducing gases.

Clearly the choice of an appropriate chemical composition of the layer requires dedicated consideration of the chemical behaviour in the presence of each specific gas, whether hydrogen, helium or other gases.

Radiation damage is a second, important element which has to be carefully investigated since, like the chemical stability of the layer, it may limit the extent of the achievable burn-up.

3.1.10) The integrated neutron flux inside the moderator's corresponding to 1/e of the fuel transmuted is:

$$\int \phi dt = 1/(\sigma_{fiss} + \sigma_{fiss})^2$$

$$= 10^{21}/(1.099 + 5.248) = 1.57 \times 10^{20} \text{ n/cm}^2$$

($^{242m}$Am), i.e. quite small because of the large absorption cross sections of the fissionable fuel. In addition, the spectrum is strongly peaked around thermal energies, which further reduces the radiation damage. This integrated neutron flux is several orders of magnitude smaller than the one typical for the spent fuel of an ordinary reactor. Therefore there are serious problems, neither in the engine elements nor in the reflector, even after many refuelling.

3.1.11) A potential technical problem is related to the stability of the $^{242m}$Am layer under the strong ionisation of the locally produced FF. The total radiation damage of the $^{242m}$Am layer has been estimated to be roughly of the order of 30 d.p.a. (displacements per atom) over the maximum perspective burn-up, corresponding to one half of the fuel fissioned. Beam windows exposed to charged particle beams, like it is the case for the dominant contribution due to the FF, show no serious damage after such an exposure dose. Since the fission exposed layer has no independent, structural function, radiation damage per se should not be a problem. This is especially so if a suitably high temperature provides for some regeneration annealing. Ordinary metal and oxide fuels in fast breeders have been successfully exposed to a burn-up which is about ½ of the value considered in our applications. Note that in their case the radiation damage due to the fast neutrons, for which the radiation damage is far superior than in our case, has to be added.

3.1.12) Another possible cause of loss of part of the $^{242m}$Am layer may be a direct ejection (knock-out scattering) from the layer. However, over the indicated burn-up period, the total flux of outgoing ions is $\phi \approx 1.21 \times 10^{18}$ a/cm$^2$ and the fraction ejected for a cross section $\sigma_{ej,q=0}$ is $dn/n = \phi \sigma_{ej,q=0}/2 = 0.6 \times 10^{18} \sigma_{ej,q=0}$, where the factor ½ takes into account of the fact that the outgoing ion source is uniformly distributed within the layer. For $dn/n \leq 0.1$ we have $\sigma_{ej,q=0} \leq 1.64 \times 10^{-19}$ cm$^2$, which is a conservative upper limit.

3.1.13) A substantial fraction (50%) of the FF from the layer are penetrating the supporting foil and remain implanted in it. This situation is not different of the one of the cladding of a fuel of an ordinary reactor, in which FF emitted by the edge of the fuel are impinging on the retaining cladding's wall. As in that case, no serious problem is anticipated.

It should be stressed that the survival of the layer all along the anticipated fuel burning, which is an important point, since the engine must operate with the minimum initial fuel stockpile, is strongly dependent on a careful manufacturing process in view of the above-mentioned effects.

It is of interest to examine the evolution of the isotopic composition of the fuel layer during an extended nuclear burning. The produced specific power is given in terms of MWatt/kg of initial fuel. Assume such a power delivered at a constant rate over a period of time (days). The total specific energy (burn-up) which can be extracted from the fuel may be therefore expressed in terms of MWatt/kg×day. Complete nuclear transformation of 1 kg of $^{242m}$AM—with about 90% fissioned and 10% transmuted into (sterile) $^{243}$Am— produces about 840 Mwatt×day, or equivalently 7.26×10$^{13}$ Joule, roughly equivalent to the energetic content of 1000 tons of the best chemical fuel (liquid O$_2$+H$_2$).

One may expect to reach a practical burn-up which is about one half this theoretical limit. This means that about one half of the $^{242m}$Am will be actually burnt, assuming of course that the thin layer is not otherwise damaged or evaporated away during the burning.

The time evolution of the isotopic composition of the fuel due to nuclear burning has been simulated with a complete Monte-Carlo programme. The programme uses a realistic geometry with $^{242m}$Am fuel, burnt with a constant power delivery. The time evolution of the fuel composition, including decay of all elements and especially FF has been simulated. In the evaluation of the multiplication coefficient k, the effects of all secondary reactions have been taken into account. The accumulation of FF inside the engine, as time goes on, introduces an additional source of captures and therefore a reduction of the multiplication coefficient. FF are assumed to remain all inside the engine and therefore to contribute fully to neutron captures. This is conservative, since in reality about 20÷30% of the FF are immediately expelled with the gas. Some of the remaining FF may diffuse out of the thin layer and be progressively lost in space mixed with the propellant. Incidentally, the short term (a few minutes) retention within the engine of a major fraction of FF (70÷80%) is useful in order to provide with enough "delayed" neutrons to ensure the control of criticality, as in the case of an ordinary reactor.

The fuel burning is stopped when the value of k drops below 1. The raw multiplication coefficient k, in absence of control rods, after a first, almost immediate drop due to captures in the Xenon FF, is falling gently with the burn-up, reaching the end of the criticality regime after about 500 Mwatt×day/kg. The bulk of the drop is related to the mass reduction of the fuel due to fission and to capture. Evidently, at this point, refuelling is required.

The fraction of the neutrons captured by FF accumulated amount to only about 10% at the maximum burn-up of 500 MWatt×day/kg. This fraction decomposes into a constant contribution of xenon, which is quickly transmuted and an otherwise progressively rising contribution from the rest of the FF products. As already pointed out, this figure has to be considered as a conservative upper limit of the actual neutron loss due to the accumulation of FF products in the engine, since xenon and other elements are most likely to be readily diffused in space.

4.—Heating Procedure 4.1—The FF Heating Process

Figure 7:
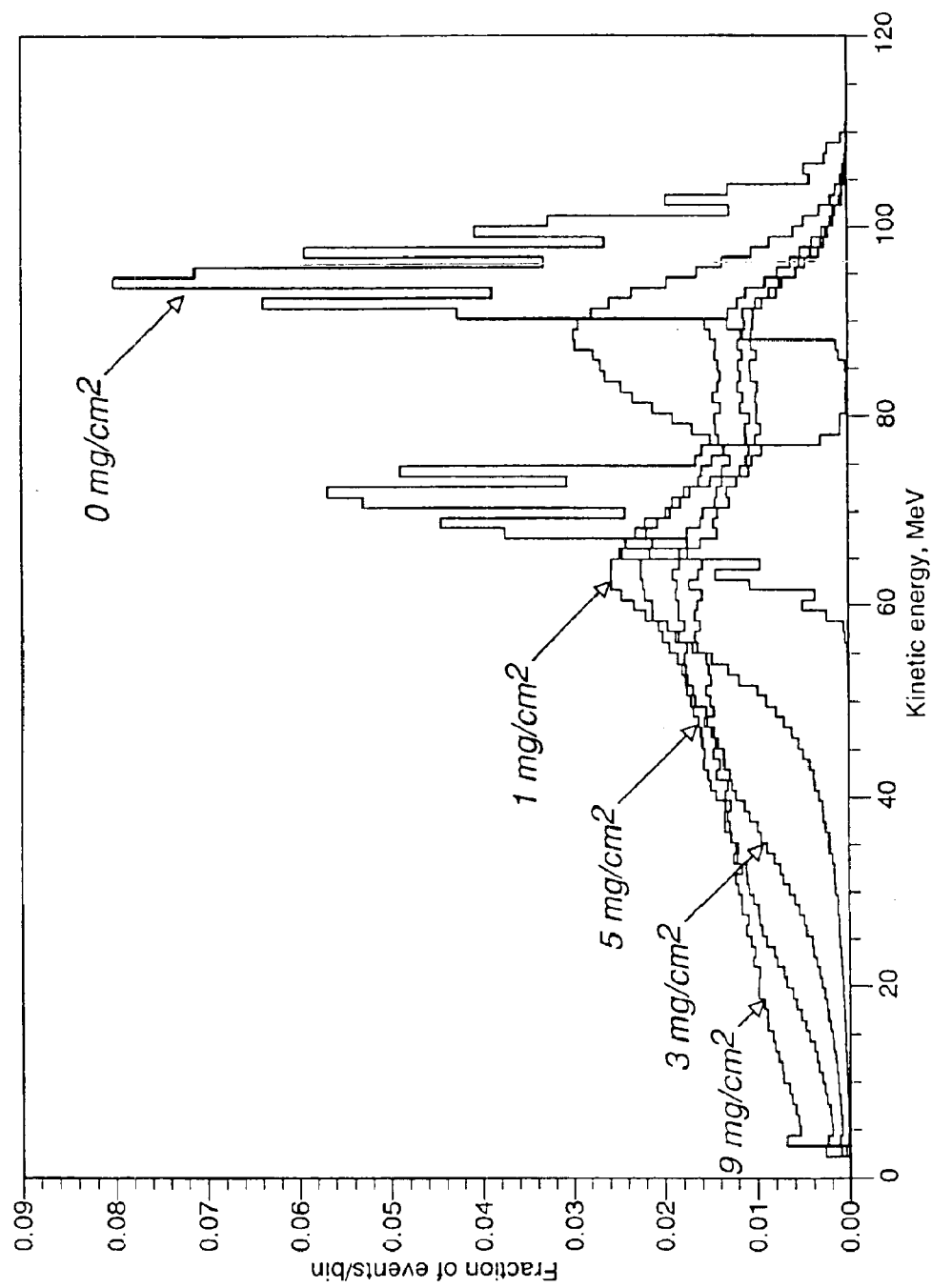
FIG. 7 is a graph showing the emerging FF kinetic energy spectrum, averaged over daughter nuclear composition, for different deposit thickness.
Figure 8:
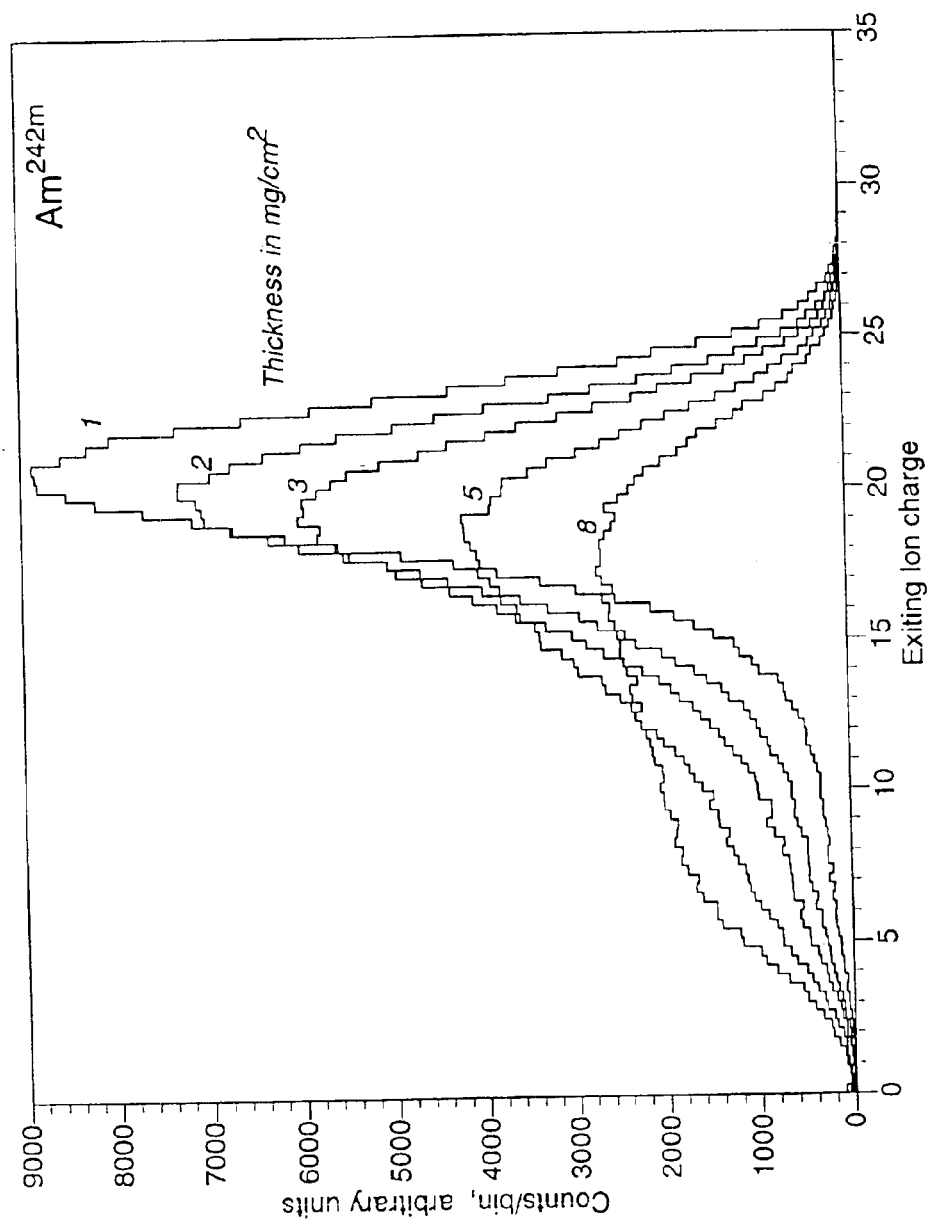
FIG. 8 is a graph showing the surviving net ion charge distribution at the exit of the foil, averaged over daughter nuclear composition, for different deposit thickness.

The typical kinetic energy spectrum in MeV of the FF emerging from the foil is shown in FIG. 7. FF retain a substantial fraction of their atomic electrons, thus their charge is not equal to Z. The surviving charge distribution at the exit of the foil is shown in FIG. 8.

Figure 9:
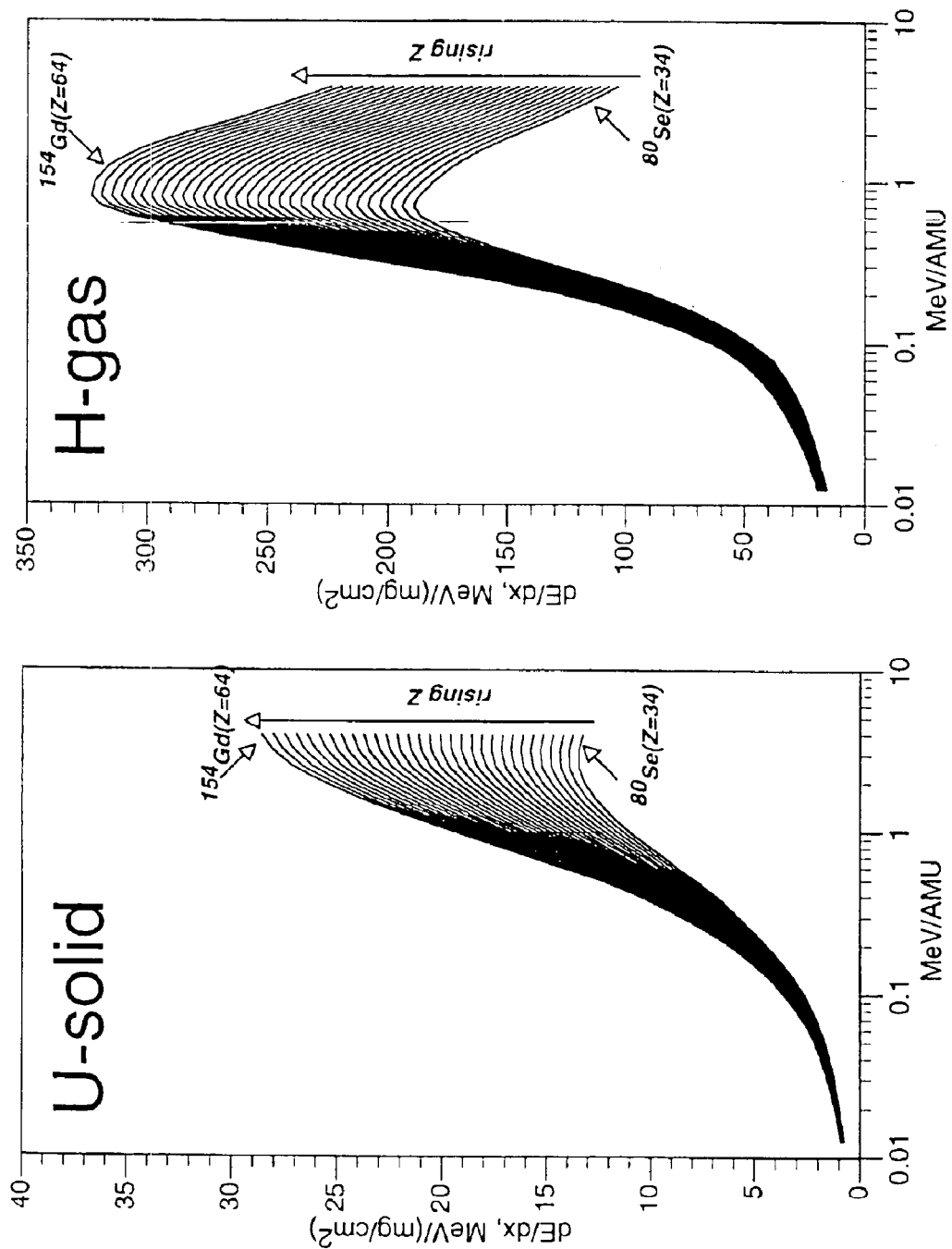
FIG. 9 shows the specific energy losses (MeV per mg/cm$^2$) for a variety of ions from Z=34 to Z=64 in solid Uranium and Hydrogen gas, as a function of the kinetic energy in MeV/AMU. We remark the much greater specific ionisation losses in Hydrogen, due to the slower speed of the orbital electrons. The surviving ion charge is decreasing at lower speeds and it is the cause of the smaller ionisation losses at low ion speed, i.e. absence of the Bragg's peak.

We are interested in the energy losses energy losses in the gas departing from the layer, initially at the temperature of the layer and which is progressively heated to high temperatures while moving away from the foil. The specific ionisation losses in the low Z gas (MeV/($\mu$g/cm$^2$)) are fortunately much greater (typically 20 times) than the ones in the high Z fissionable layer (FIG. 9). Energy losses are depressed in the layer since the speed of the FF is generally smaller than the one of the inner electrons of the high Z layer. Thus a much smaller thickness of gas is sufficient to extract most of the energy of the FF.

The difference is further enhanced when the gas, under the effect of the high temperature, is becoming ionised, since energy losses are further enhanced in a sea of free electrons. This is a fortunate circumstance since in the case of a very hot gas, FF-heating has to compete with radiant energy losses which subtract energy locally to the gas. Evidently the heating process will stop when there is balance between these two processes. Integration over the source distribution in the foil, the angular distribution of the FF and their mass spectrum leads to the efficiency curve of FIG. 1, in which the fraction of the total energy delivered by fission exiting the foil in the form of energetic FF is given, in the case of $^{242m}$Am. Very similar curves are obtained for the other candidate fuel elements indicated above.

We now proceed to a specific discussion of the gas heating process by the FF emitted by the layer. We start considering a one-dimensional model of an infinitely extended, thin planar foil with uniform unit surface specific fission power emitted out of the foil $d^2P/dxdy=\Lambda$, followed by a half space filled with hydrogen. This very simple model permits to elucidate the main feature of the process. More elaborate calculations taking into account the exact geometry of the engine are presented further on.

The gas density is in turn strongly dependent on the temperature and so will the power delivered over the volume. In order to remove such a temperature dependence it is preferable to consider as a variable the traversed gas thickness in mg/cm$^2$. As long as the gas temperature is below ionisation threshold, specific ionisation energy losses are strictly proportional to density.

Figure 10:
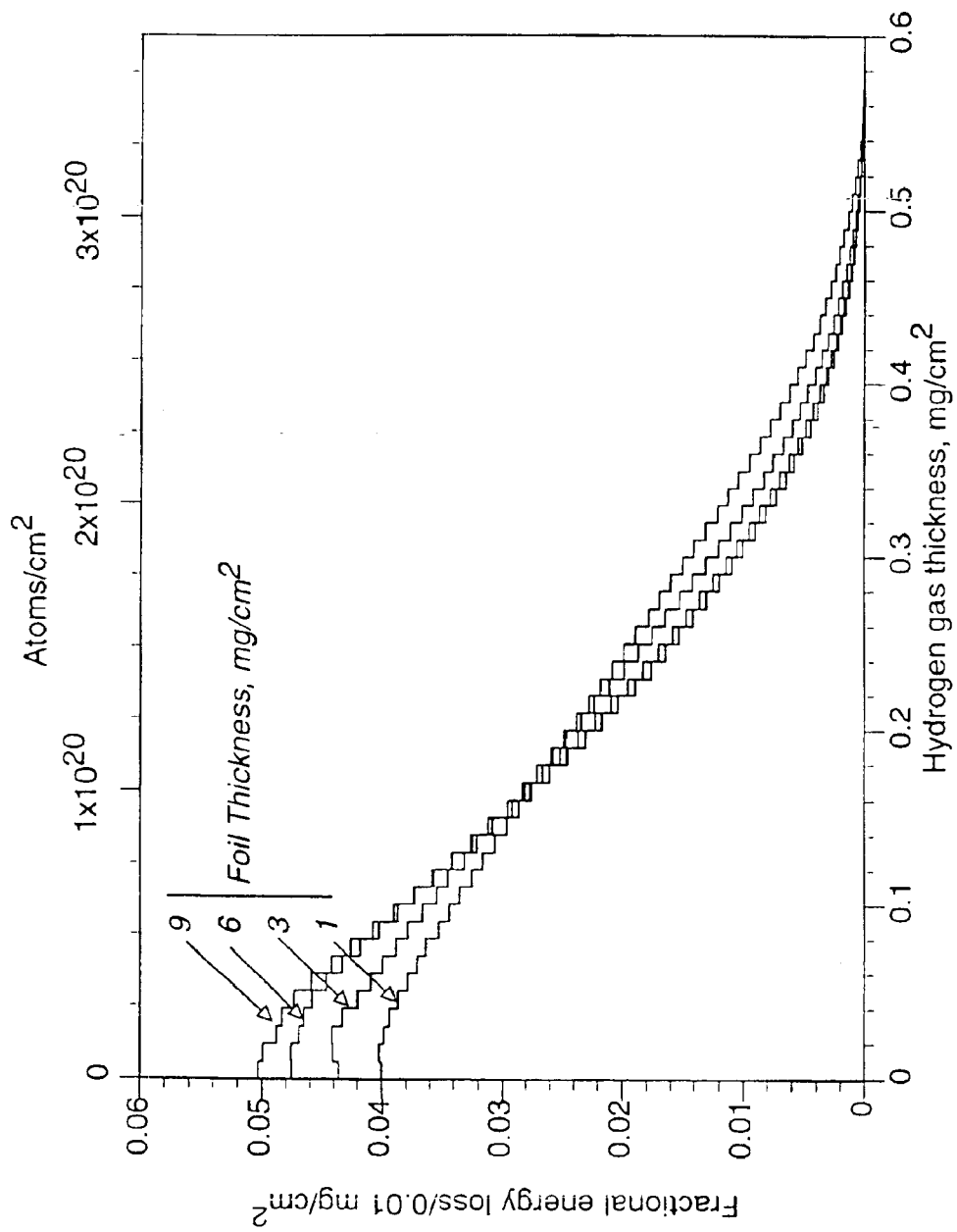
FIG. 10 is a graph showing the specific energy deposition, averaged over the FF spectrum and directions in hydrogen gas as a function of the distance from the (infinite) foil, for various deposit thickness.

More specifically, in steady conditions of an infinite foil, the specific energy deposition (defined as energy per unit of mass and time, or equivalently as power per unit of mass) of the FF emitted by the foil per unit of gas mass dW/dm, is a function of the transverse distance from the foil z and of the (uniform) gas pressure $p_0$. Therefore the dependence on the temperature of the gas density $\rho(z)$ can be removed, with a variable substitution, in which the "thickness" co-ordinate $$t(z) = \int_{z'=0}^{z'=z} \rho(z') dz'$$

is used instead of z, where $\rho$ is the local density. We are interested in dW/dm=$\Lambda\omega(t)$, the local power deposition per unit of gas mass. Evidently $\int \omega(t) dt=1$, since integration of dW/dm over the variable t(z) gives the power density emitted by unit area $\Lambda$. The function $\omega(t)$ calculated with a Monte-Carlo method is shown in FIG. 10 for a number of different foil thickness. The result indicates a function $\omega(t)$ smoothly falling with t (i.e. the highest specific energy deposition occurs near the foil) and extending to a maximum range of about 500 $\mu$g/cm$^2$, corresponding to 3×10$^{20}$ atoms/cm$^2$. Most of the energy is deposited within about 1.5×10$^{20}$ atoms/cm$^2$.

Figure 11:
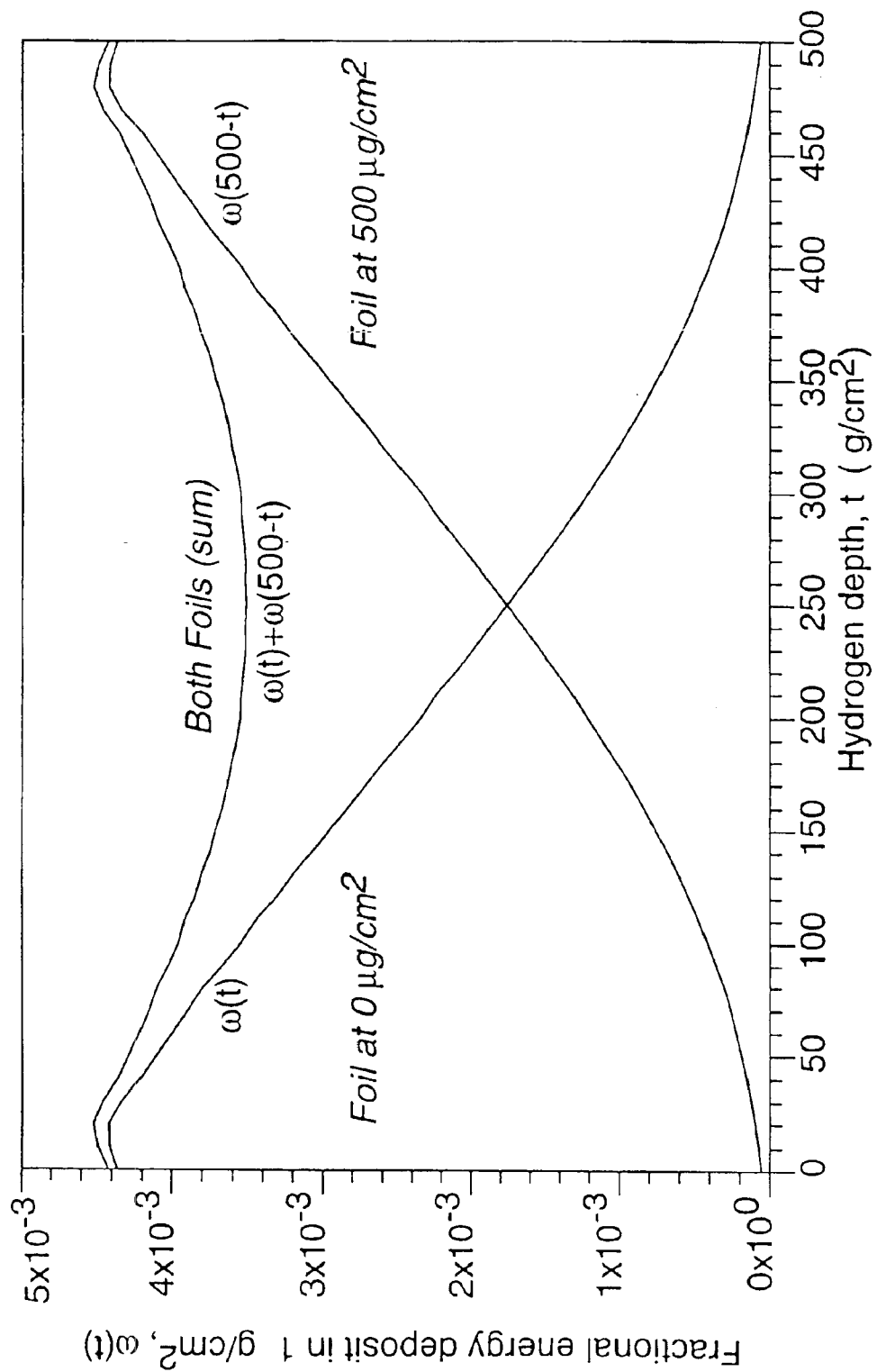
FIG. 11 is a graph showing the fractional energy deposition in 1 $\mu$g/cm$^2$ ($\omega$(t)) due to FF at the distance t ($\mu$g/cm$^2$) from an infinite uniform foil with a deposit of $^{242m}$Am, 3 mg/cm$^2$ thick. The combined effect of two such foils facing each other at a distance of 500 $\mu$g/cm$^2$ is also shown. In order to find the actual energy deposited in 1 $\mu$g/cm$^3$ of Hydrogen we must multiply $\omega$(t) by the energy emitted by each foil per cm$^2$.

The energy deposition becomes considerably more uniform if the gas is contained in the gap between two of such foils placed at a gas thickness of the order of 500 $\mu$g/cm$^2$ apart (the separation value can be set in a given engine geometry for instance by adjusting the operating pressure). The sum dW/dm=$\Lambda[\omega(t)+\omega(500\ \mu g/cm^2-t)]$ exhibits a relatively flat distribution (FIG. 11).

Figure 12:
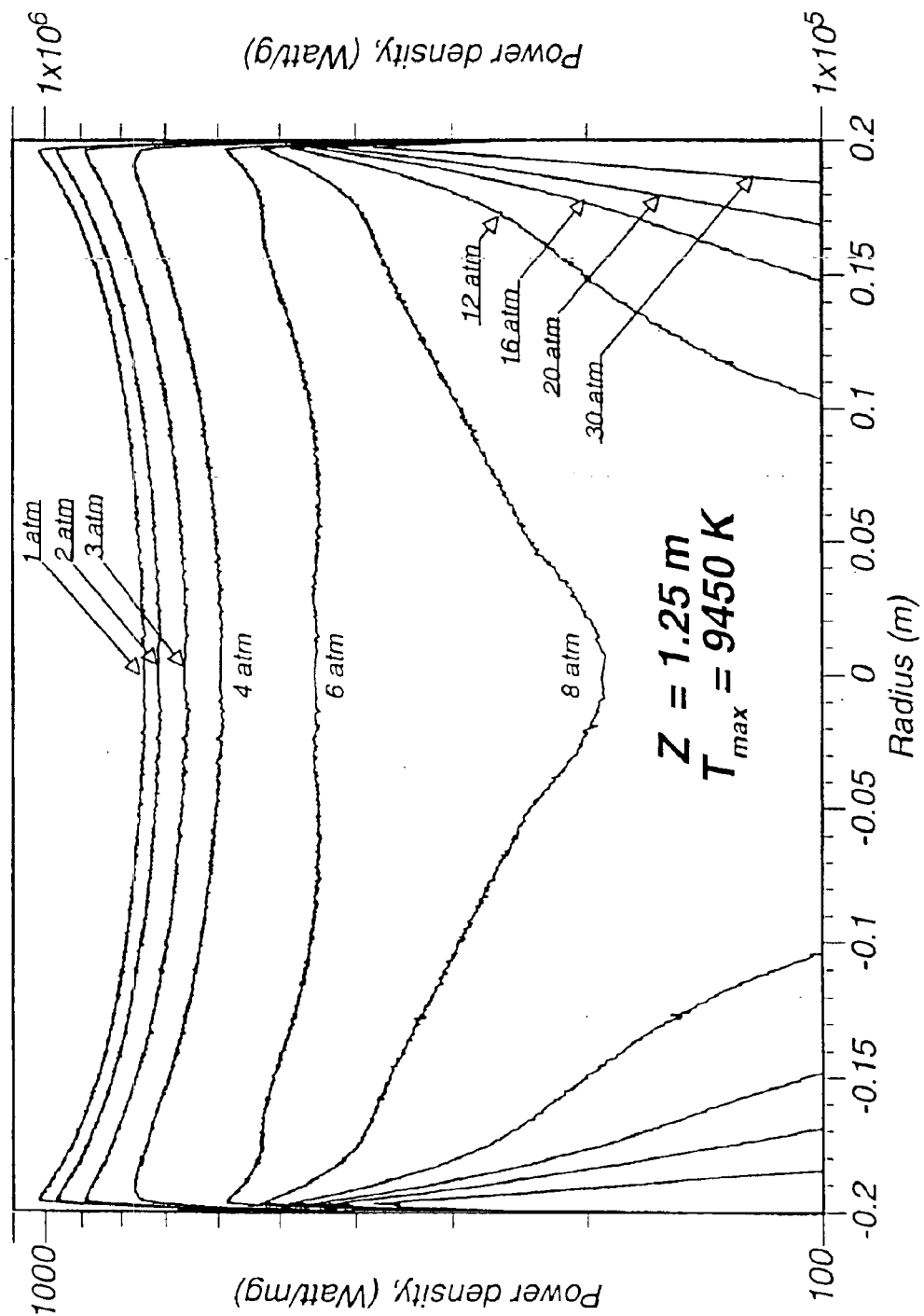
FIG. 12 is a graph showing the power density dW/dm deposited in the gas according to a coupled hydrodynamic and FF propagation numerical calculation for the cylindrical geometry of FIG. 5 and a specific total nuclear surface power density of 200 Watt/cm$^2$. The final temperature is radiation limited to 9400 K. The tube diameter has been set to 40 cm and the tube length to 250 cm. However the ratio size/pressure is an excellent scaling parameter in order to extend the result to different tube diameters. As long as the length is much greater than the tube diameter, the energy distribution in the central part is uniform and independent of the tube length. Several pressures in the interval 1÷30 bar are displayed.

A correct analysis of the heating process requires a coupled hydrodynamic and FF propagation numerical calculation, which has been performed with the geometry of FIG. 5 and a final temperature of 9400° K (radiation limited, see later on). The tube diameter has been set to 40 cm and the tube length to 250 cm. However the ratio size/pressure is an excellent scaling parameter in order to extend the result to different tube diameters. As long as the length is much greater than the tube diameter, the energy distribution in the central part is uniform and independent of the tube length. The power density emitted by unit area has been set to A=200 Watt/cm$^2$. We note that even for such a relatively modest value of A the specific energy deposition dW/dm≈10$^6$ Watt/g in the gas is very large indeed. The resulting distribution (FIG. 12) show that dW/dm is relatively uniform, as predicted by one dimensional model, provided the pressure is adjusted to match the range of the FF to the diameter of the tube. For pressures much lower than the optimal one a significant fraction of the FF hit again the walls of the tube. For much larger pressures, FF stop before reaching the central part of the gas.

Figure 13:
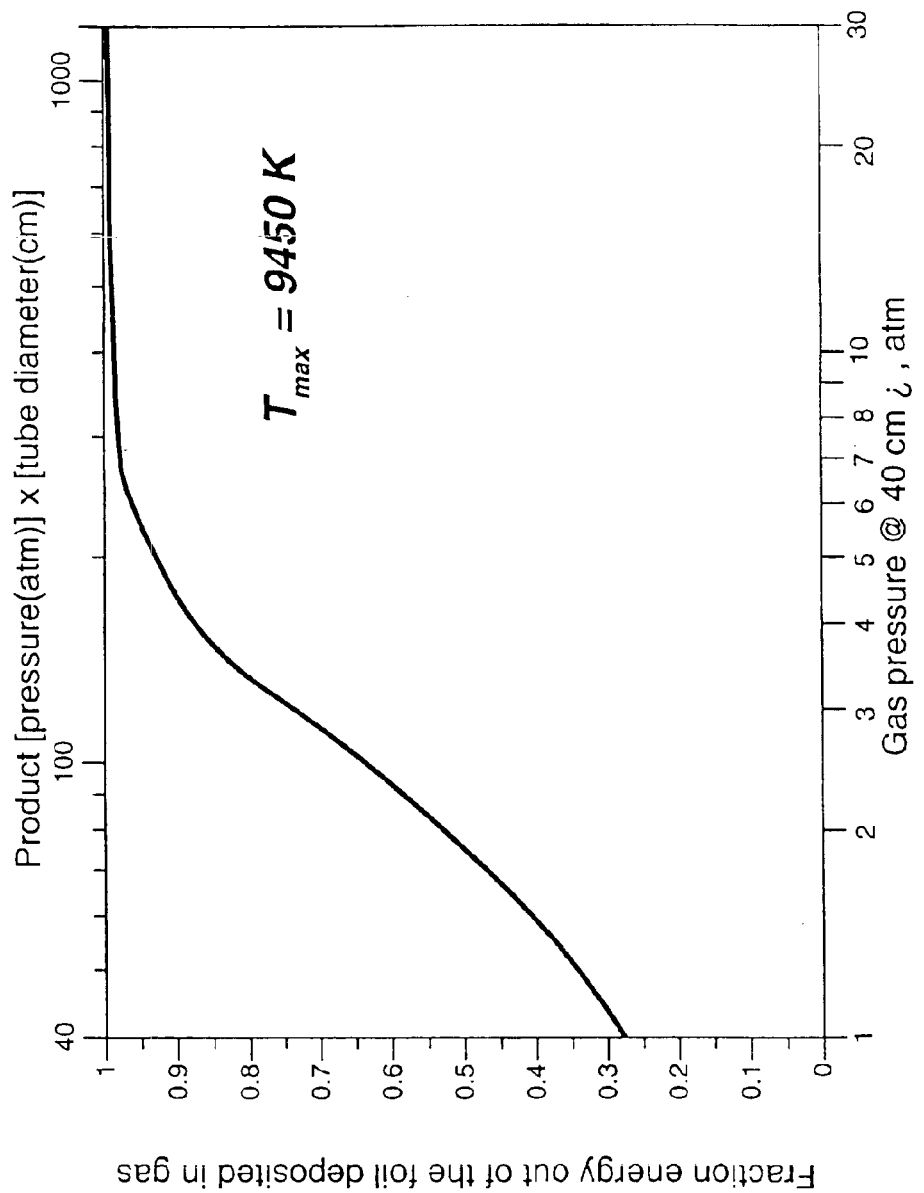
FIG. 13 is a graph showing the fraction of the FF energy deposited in the gas dW/dm as a function of the gas pressure according to conditions described for FIG. 12. The "scaling" parameter is the product [pressure]×[tube diameter].
Figure 14:
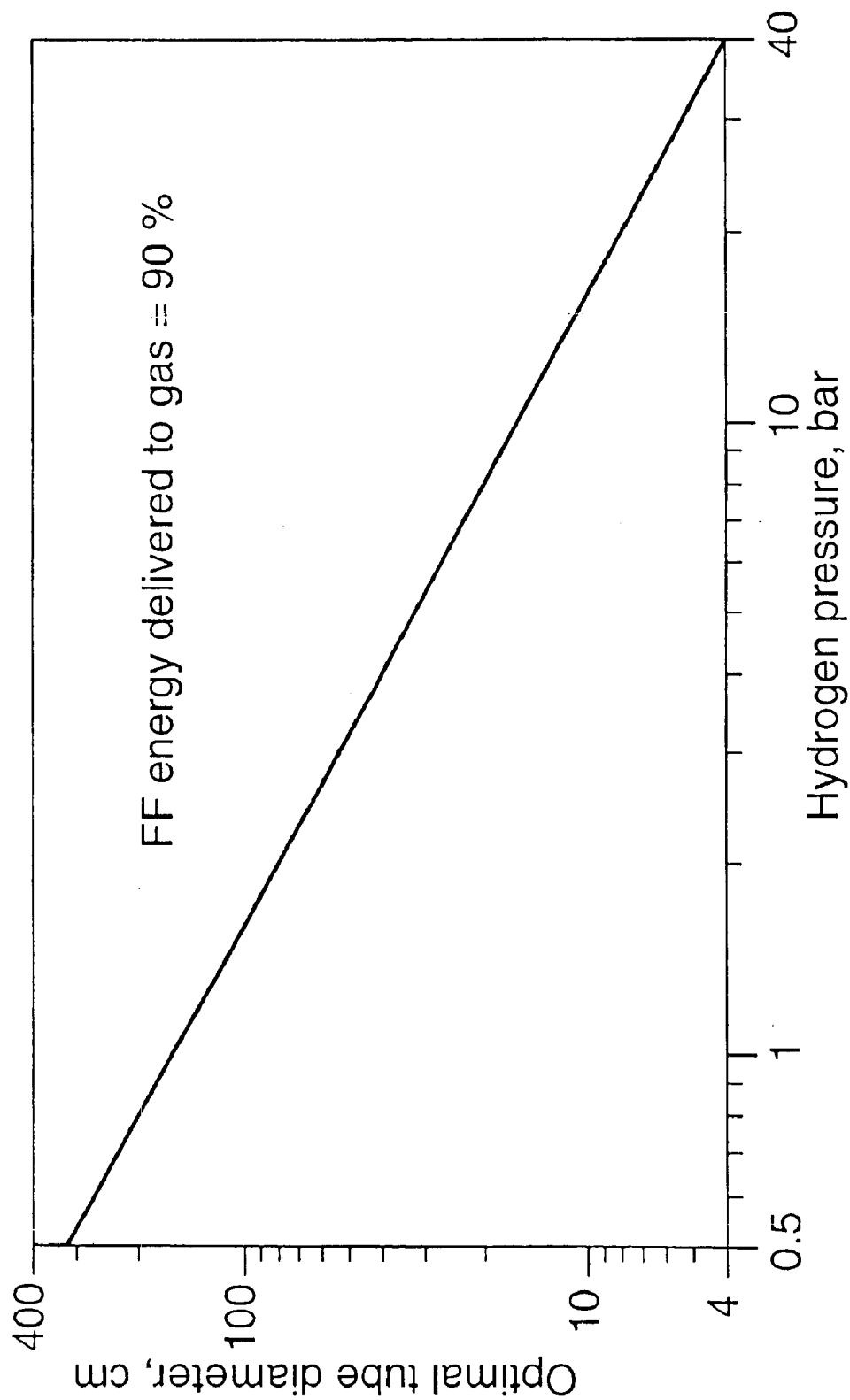
FIG. 14 is a graph showing an optimal tube diameter for the geometry of FIG. 5 and 90% FF energy deposition in the gas as a function of the tube pressure.
Figure 15:
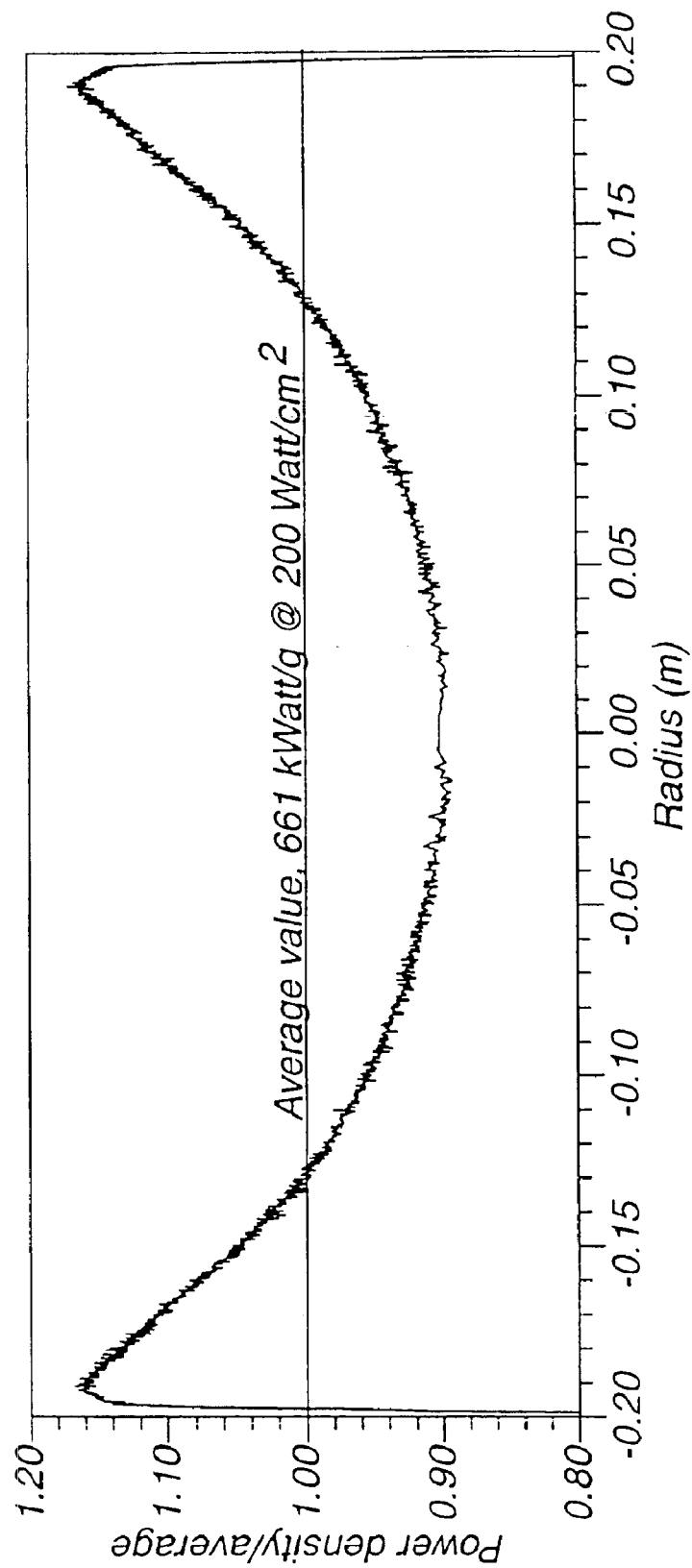
FIG. 15 is a graph showing the radial variation from uniformity of specific FF energy deposition dW/dm at optimal pressure (90% FF energy deposition in the gas) and cylindrical geometry of FIG. 5, according to conditions of FIG. 12.

The fraction of FF energy deposited inside the gas as a function of the gas pressure is shown in FIG. 13. We remark the use of the scaling variable [tube diameter]×[pressure]. The optimum tube diameter has been somewhat arbitrarily set to a 90% FF fragment energy deposited in the gas and it is shown in FIG. 14 as a function of the tube pressure. The resulting heating power distribution is very flat within about ±12%, as shown in FIG. 15.

To conclude, for a relatively modest surface nuclear power density of the foil of A=200 W/cm$^2$, the specific, volume averaged power given to the gas is dW/dm≈0.661 MWatt/g, very large indeed.

Heating powers of the order of one Megawatt for each gram of gas are therefore feasible with acceptably low foil surface heating. Evidently there is a direct proportionality between the surface power dissipation on the foil and the (almost constant) specific massive energy deposition in the gas. As we shall see later on, the dwelling time of the gas in the tube being relatively long (several seconds) it is possible to reach the required gas temperature with a foil surface power density typically in the interval 20÷200 Watt/cm$^2$, which is much smaller than the technical limit due to cooling.

4.2—Radiative Losses

The hot gas emits radiant energy, which can be either re-absorbed by the neighbouring gas or dissipated onto the engine walls. Such a radiative effects are expected to be a rapidly rising function of the gas temperature and play an important role in the operation of the engine. Indeed, the maximum temperature that the FF heating process may achieve is limited by the equilibrium condition between the specific power brought in by the FF and the power radiated in the frequency domains in which the gas is optically "thin". Therefore these effects determine the ultimate performance of the method.

It is a fortunate circumstance that the basic equations for hydrogen atoms and free electrons are well known theoretically. Molecular hydrogen persists only up to temperatures which are below those relevant for significant radiative losses. Therefore a solid theoretical background exists, at least in the case in which hydrogen is the propulsion element. We shall limit to a summary of results. All transitions, namely bound-bound, bound-continuum and continuum-continuum have been included.

Figure 16:
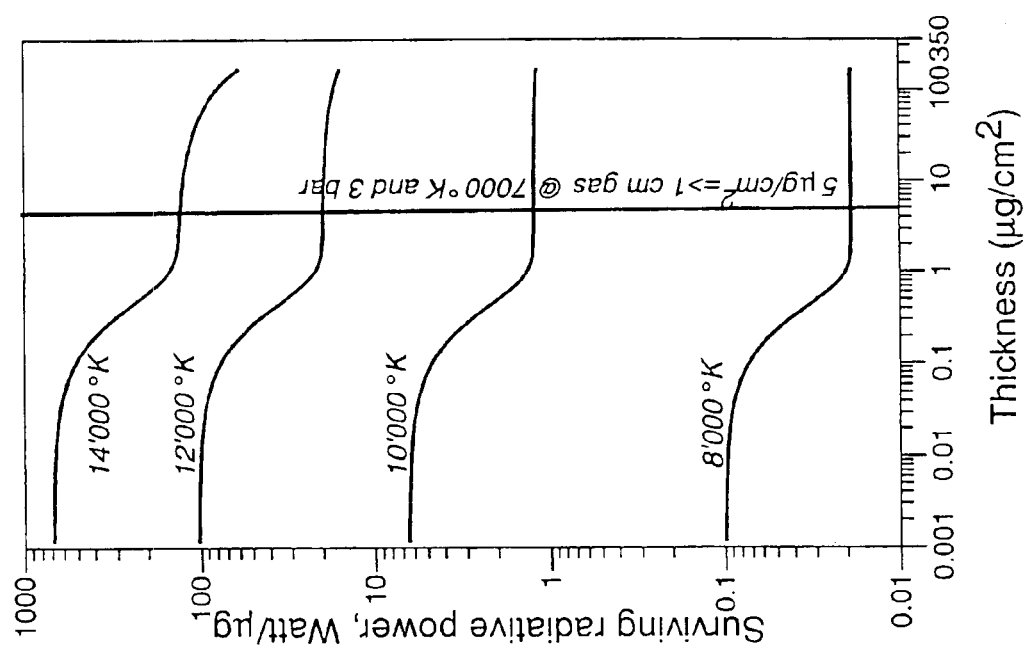
FIG. 16 is a graph showing the surviving radiated power, integrated over the spectrum, in Watt for 1 $\mu$g of radiating gas as a function of the traversed gas thickness, for various gas temperatures. The value of 5 $\mu$g/cm$^2$ corresponds to about 1 cm of gas at 7,000° K at a pressure of 3 atm.

The surviving emitted power carried by radiation after crossing a thickness L of gas (in $\mu$g/cm$^2$) is shown in FIG. 16. The spectrum is peaked in the visible, with a substantial tail in the infra-red.

One observes a fast drop of surviving power with traversed thickness in the region corresponding to a fraction of centimeter of gas. A substantial fraction of the radiated power is clearly re-absorbed in the vicinity of the emission point, incidentally where the gas temperature is very close to the one of the radiating element. This contribution can be safely neglected, since it contributes to an apparent increase of heat conductivity. Following this fast drop, one can observe a relatively long plateau, corresponding to radiation to which the gas is essentially transparent. This radiation normally escapes out of the heating volume and hits the engine's walls, where it may be absorbed or diffused/reflected back into the gas volume.

As clearly shown from FIG. 16, the vast majority of the emitted radiation, at least as long as 12,000° K, sharply clusters in two distinct spectral regions:

4.2.1) one in which the radiation is safely absorbed well before the indicative thickness of 5 $\mu g/cm^2$, (corresponding to 1 cm of gas at 3 bar and 7,000° K), causing a nearby heat transfer and 4.2.2) another for which the gas is essentially transparent up to paths exceeding the size of the gas volume, causing a heat loss to the walls (far-away radiation).

Both far-away radiation and FF heating process are directly proportional to hydrogen mass, but the former, in contrast with the latter, is growing very quickly with gas temperature. Therefore there will be a limiting temperature for which the specific power carried away by the far-away radiation becomes equal the one brought in by the FF. The gas temperature will be saturated at this value.

Assume that (1) the FF heating provides a constant power $W_{FF}$ per unit mass, temperature and position independent and (2) the radiation emitted by the gas removes a power $W_{RR}(T)$ per unit mass, which in turn can be calculated numerically from the radiated power for which the gas is transparent (see 4.2.2). After the time dt, a gas parcel travelling though the engine along its own tube of flux will acquire a specific enthalpy per unit mass:

$$dE = (W_{FF} - W_{RR}(T))dt$$

On the other hand, the mass flow through the engine is conserved and in steady conditions, for any given temperature is given by:

$$dm/dt = \phi = \text{const}$$

namely equal to the macroscopic massive flow $\phi$ (g/s) through the engine.

Enthalpy change is related to temperature change, by the (constant pressure) specific heat coefficient, $dE = c_p \, dT$. Combining the above equations, we can derive the time dependence of the heating process for a given gas elementary volume proceeding along a flux line:

$$dt = \frac{c_p(T)}{W_{FF} - W_{RR}(T)} dT$$

By integration, this equation may be used to calculate the dwell time of the gas inside the engine. In presence of radiative losses, which grow very rapidly with the gas temperature, a maximum temperature $T_\infty$ is reached (after an infinite time) as an equilibrium between the heat produced by the FF and radiative losses, corresponding to the condition dt/dT=0 or $W_{RR}(T_\infty) = W_{FF}$.

The distribution of the mass of the gas inside the engine as a function of the temperature $T < T_{max}$, is given by:

$$\frac{dm}{dT} = \frac{dm}{dt}\frac{dt}{dT} = \phi \frac{c_p(T)}{W_{FF} - W_{RR}(T)}$$

Figure 17:
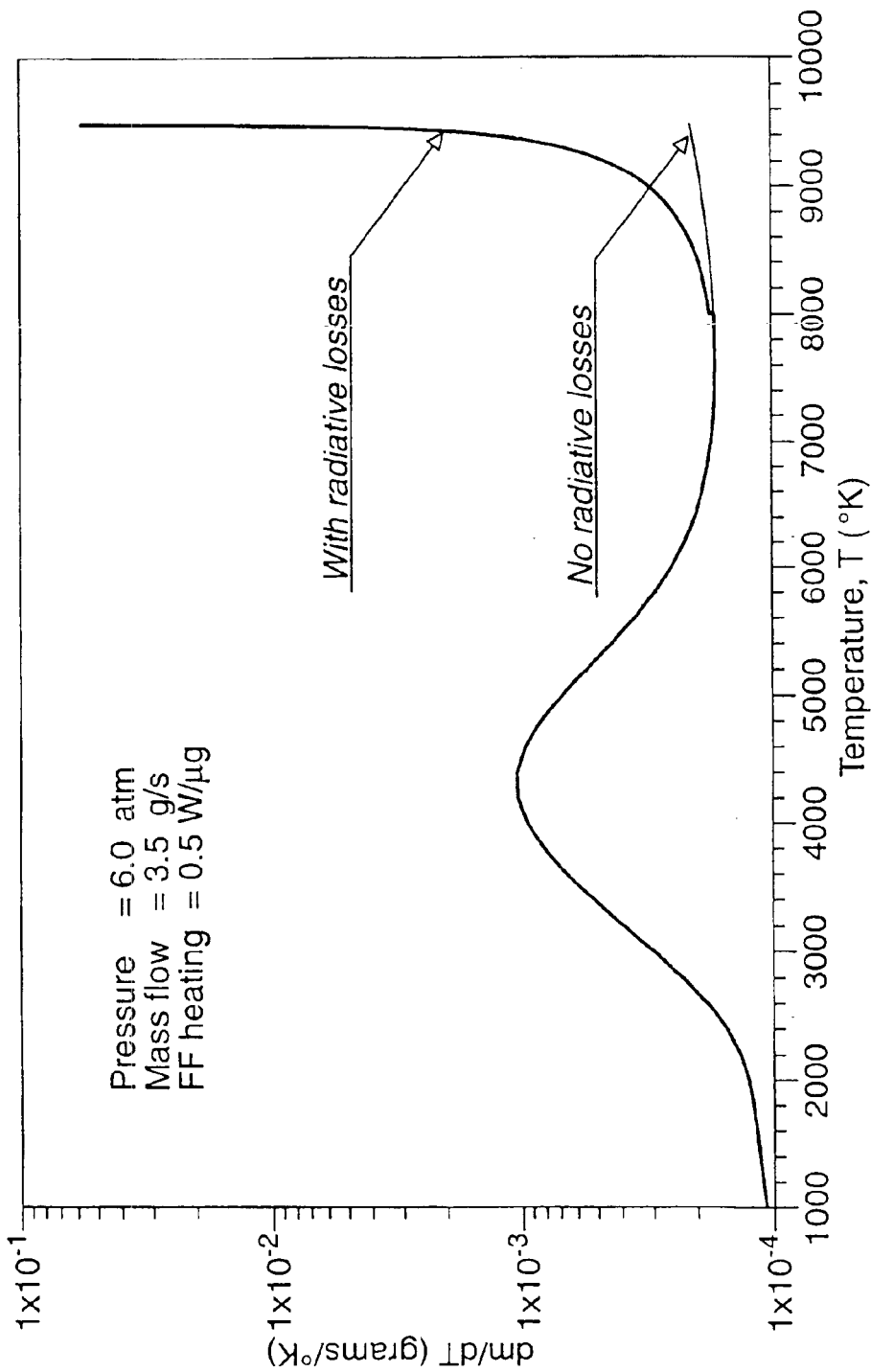
FIG. 17 is a graph showing the differential mass distribution dm/dT (g. ° K$^{-1}$) inside the heating tube (FIG. 5), as a function of temperature T, with and without the effect of distant radiative losses. The curve with radiative losses has an asymptote at about $T_\infty$=9,500° K, because of the equilibrium between FF heating power and radiated power.

A typical temperature distribution is shown in FIG. 17, with and without the $W_{RR}(T)$ term. We note the rapid onset of the radiative losses and the asymptotic maximum temperature for $T_\infty = 9,500°$ K. The total mass of gas inside the engine is easily calculated by integration of the curve in FIG. 17.

Integrating specific power over the mass distribution as a function of the temperature, we find the total radiated power ending up on the walls for a given final temperature $T_{max}$:

$$P_{\text{rad},wall}(T_{max}) = \int_{T_1}^{T_{max}} W_{RR}(T) \left(\frac{dm}{dT}\right) dT = \phi \int_{T_1}^{T_{max}} \frac{c_p(T)}{W_{FF}/W_{RR}(T) - 1} dT$$

Figure 18:
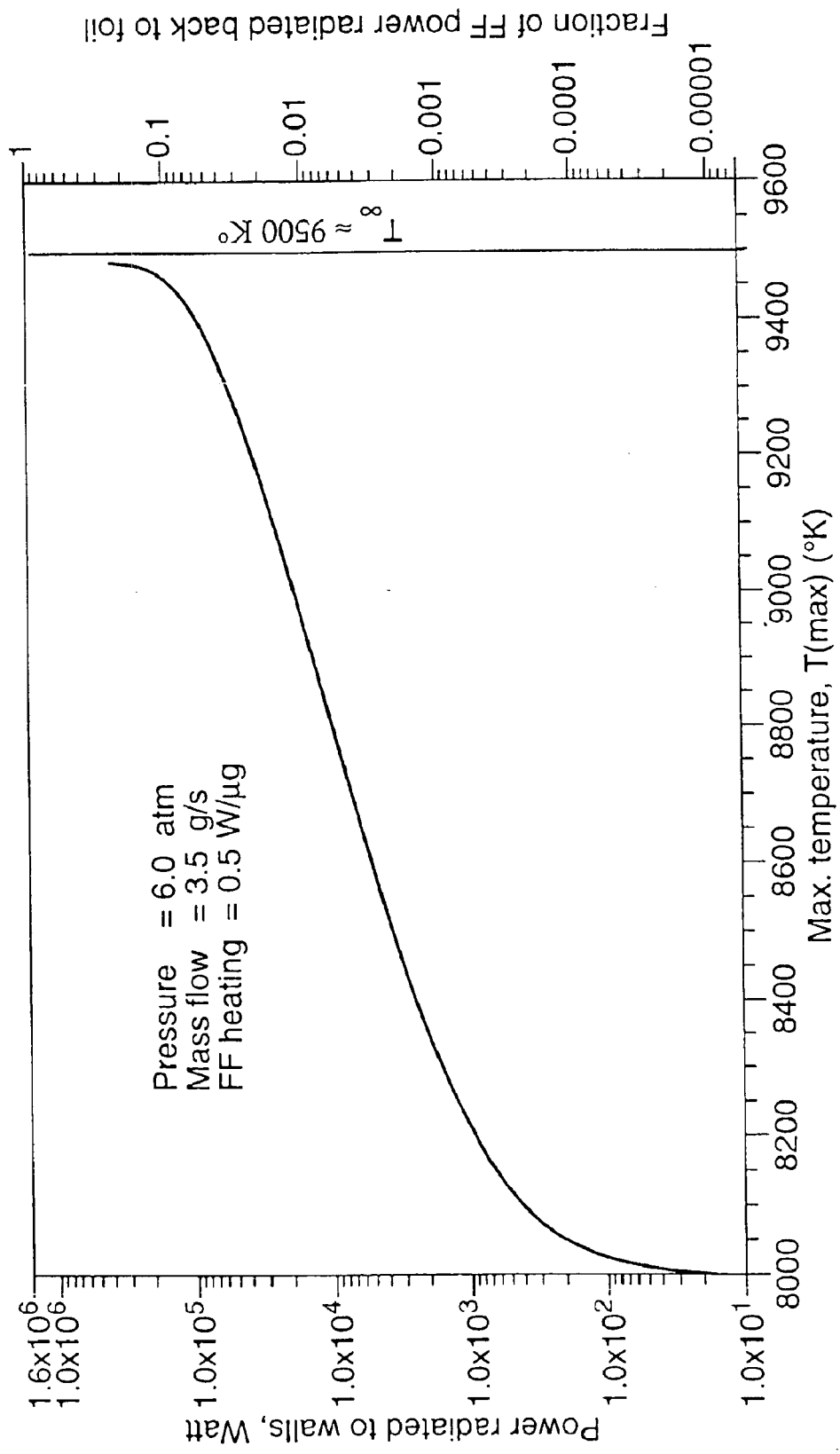
FIG. 18 is a graph showing the optical power radiated back onto the walls and fraction of the FF power radiated back to the walls, as a function of the final, stagnation temperature $T_{max}$ for an engine with parameters of FIG. 12.

The total power returning onto the walls is shown in FIG. 18, as a function of the final temperature. For not too extreme temperatures, the fraction $\eta_{rad} = P_{rad,wall}(T_{max})/P_{FF}$ re-absorbed by the walls is modest, for instance $\eta_{rad} = 0.0342$ at $T_{max} = 9,300°$ K and $\eta_{rad} = 0.0576$ at $T_{max} = 9,400°$ K. The FF actual power has to be slightly adjusted to correct for these losses.

These effects have been carefully included in the Monte-Carlo computation of the performance of the heating process. Full hydro-dynamical calculations confirm these conclusions.

5.—Design Criteria for the Space Propulsion Engine 5.1—Functional Description A typical structure is based on a relatively large number of hollow, thin cylindrical tubes, open at one end to let the gas escape to the stagnation region. Each tube (FIG. 5) is coated with a thin fissionable layer. A feeble flow of gas (of the order of 1 g/s/m$^2$) leaks uniformly from the tube walls into its interior, either though (i) capillary holes, (ii) porosity or (iii) some other equivalent arrangement. It moves slowly away from the walls, converging to the exit end, under the progressive heating action of the FF. The FF are produced by a thin (typically 3 $\mu g/cm^2$) layer of an adequate chemical compound of a highly fissile element (typically $^{242m}$Am), which provides nuclear criticality because of the highly reflective properties of the reflector. The surface power density due to fission produced on the inner wall of the tube is in the range of $\Lambda = 20 \div 200$ W/cm$^2$, corresponding—in appropriate conditions—to a FF specific heating power for the gas of the order of $dW/dm = 0.5 \times 10^5 \div 10^6$ W/g. A major fraction of the fission power (typically 70%, depending primarily on the geometry and the gas pressure) has to be removed by cooling the external faces of the tube, while the rest is used to heat-up the gas. To this effect, an appropriate coolant is in good thermal contact with the outer surfaces of tubes, in analogy of what is done for the fuel rods of an ordinary reactor.

Tubes are cooled from the outside. The cooling should be conservatively designed in such a way as to be able to handle the totality of the nuclear heat, since, in case the hydrogen gas would be suddenly missing, the full energy coming from the fission reaction must be absorbed by the wall. The outer side of the supporting wall could be cooled for instance using liquid Lithium (melting point 180° C., boiling point 1,342° C.), a technology which is used in space applications. Isotopically pure $^7$Li has to be used, since $^6$Li has a too large neutron capture cross section. On the other hand $^7$Li has excellent neutronic properties, as illustrated in Table 2. The liquid Lithium density is 0.534 g/cm$^3$. Isotopically separated $^7$Li is commercially available at relatively low price. $^7$Li has no appreciable capture cross section for neutrons and it can be used abundantly without counter indications. Therefore the typical temperature for the outer wall is likely to be in the vicinity of 1,300° C. The temperature of the fissionable layer is slightly higher, because of the temperature drop due to thermal conductivity through the wall of the tube. This temperature difference is typically not larger than a few hundred degrees ° C. for the above indicated power densities.

Almost any gas—or, more generally, any compound which is gaseous at the inlet chamber temperature and pressure—could be heated in this way. The direct use of the FF to heat a gas away from the walls does not suffer from the energy and materials limitations imposed on chemical and gas reactor derived engines. Our approach is based on an ultimately very hot final gas departing from relatively cold, FF emitting walls.

We concentrate here on the case of hydrogen, since it is the most suited propellant for space applications. The hot hydrogen gas, at the pressure of a few bars, at stagnation reaches the temperature of the order of 9,500° K, an equilibrium between heat supply by the FF and heat losses by radiation transparent to the gas and it is exhausted into space through the nozzle and an expanding cone. The very high temperature of the exhausted gas, once transformed by the nozzle into coherent motion in the direction of the thrust, produces exhaust speeds $v_{exh}$ which are much larger than the ones of a typical chemical fuel or of a classical nuclear engine. Therefore a given final rocket speed can be achieved with a substantially smaller propellant mass, which in turn extends the potential range of the journey or, alternatively, shortens its duration.

The (hydrogen) gas is in a good approximation operating at an approximately constant pressure in the range from 4÷20 bar. Note that this pressure range is only indicative since (1) the heating mechanism is almost pressure independent and (2) radiative losses are only very slowly affected by the operating pressure (pressure line broadening, etc.). The hydrodynamics and the FF heating process are scaling as (pressure×size) as long as the gas behaviour is close to the one of a perfect gas. Neutron reflector related considerations may suggest that the lightest device is the one with the smallest core, i.e. the highest possible pressure. However there is no point in making the core much smaller than the required thickness of the reflector. Also the gas input temperature is somewhat arbitrary; the output, saturated temperature is of the order of 9,500° K, limited, as already illustrated, by the radiative losses of the hot gas. Therefore a substantial amount of freedom exists in the choice of the parameters which are application dependent.

On the basis of these considerations, we arrive at an engine concept which is based on the following four main components, (1) the reflector, (2) the FF-heating region, (3) the gas expansion and exhaust region and (4) the cooling system. These components are described in more detail herebelow.

Figure 19:
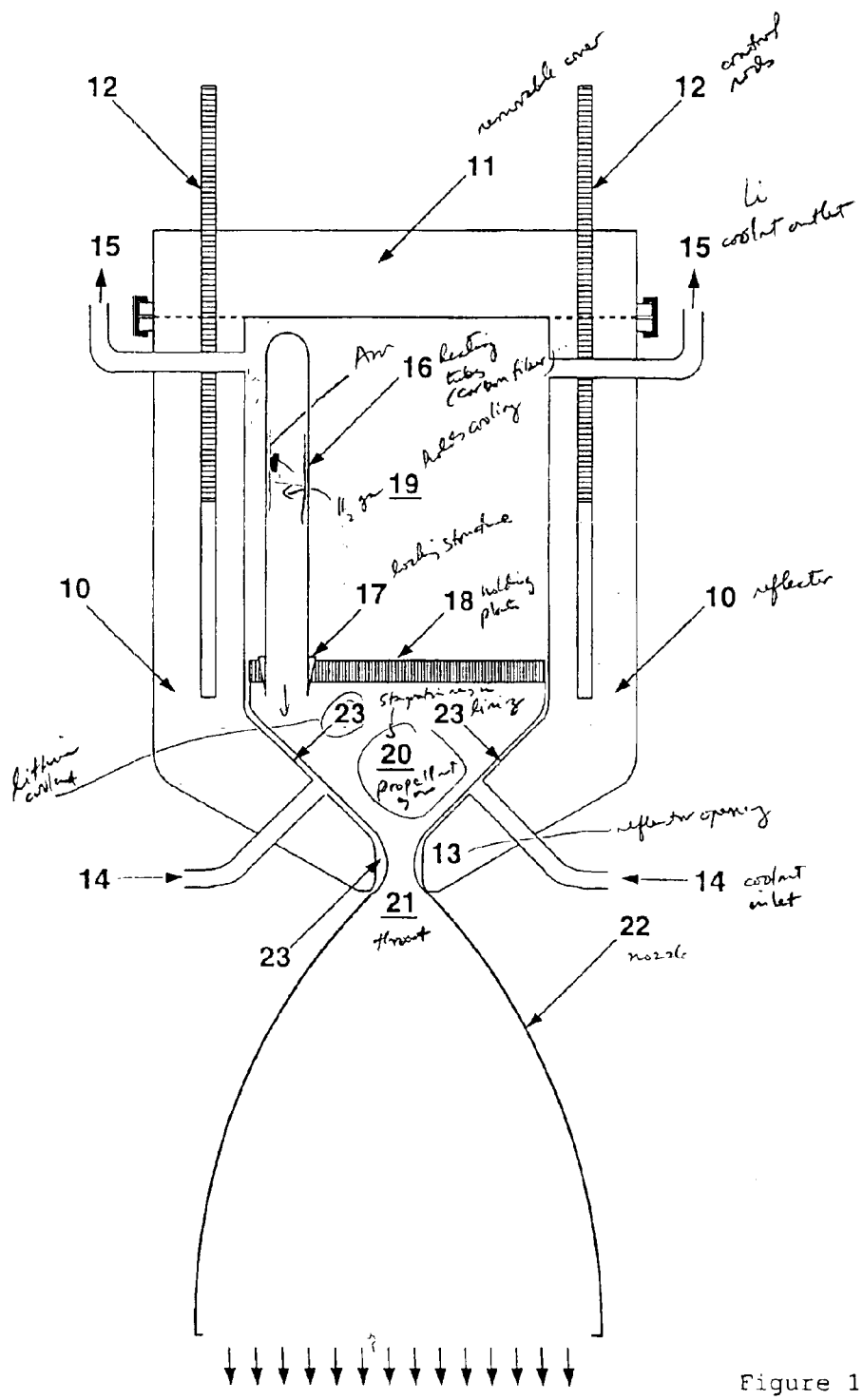
FIG. 19 shows the basic layout of an engine according to the invention. Dimensions and number of tubes are purely indicative.
Figure 20:
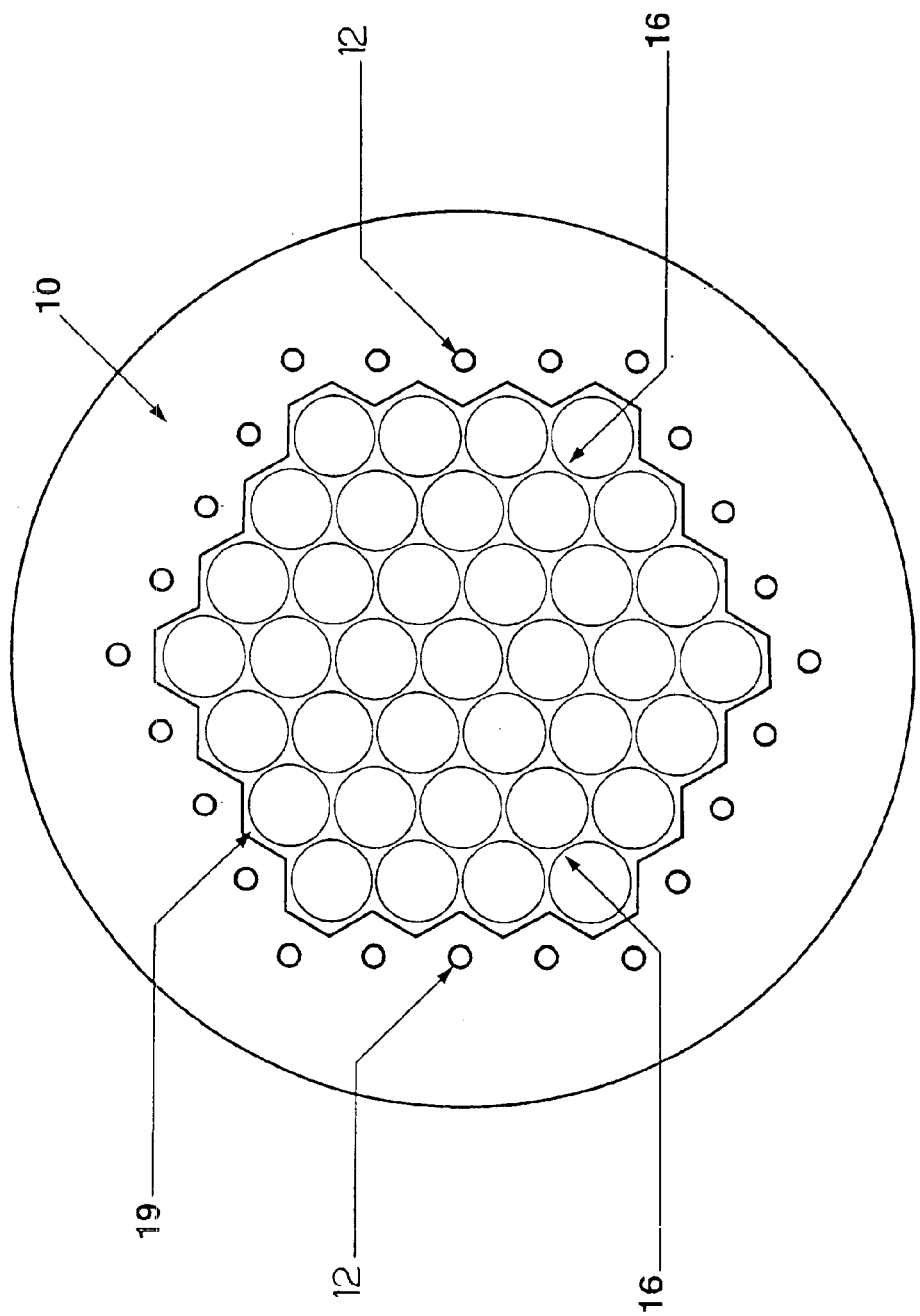
FIG. 20 is a cross-sectional view along the medium plane of FIG. 19. Dimensions and number of tubes are totally indicative.

We refer to FIG. 19 for the basic layout of the engine. FIG. 20 shows a cross-sectional view along the medium plane. Dimensions and number of tubes are purely indicative.

5.2—The Reflector

It contains and reflects the neutrons from the fissile core. Two main (solid) high purity elements are excellent candidates in order to constitute the bulk of the moderator's cavity because of their high neutron reflecting power: (I) Carbon (graphite, carbon fibers) of Beryllium (either metal or BeO).

There is a substantial freedom in the actual realisation of the reflector. For instance, if required by weight's minimisation, the moderator could be made of several layers:

5.2.1) a first, inner layer which is very efficiently reflecting neutrons (e.g. BeO), followed by p1 5.2.2) a second thinner layer, made for instance of a hydrogen compound, since hydrogen has a much shorter diffusion length $$L = 1/\kappa = \sqrt{D/\Sigma_{capt}}$$

but a less favourable $F=1/\sqrt{kD}$.

5.2.3) The moderator may be lined on the outside with a thin (a few cm) layer of strongly neutron absorbing material like for instance $CB_4$, in order to reduce leakage in the surroundings.

The reflector 10 has a removable cover 11 which is used also for refuelling. This is also the natural place where to locate the control bars 12, (made e.g. of $CB_4$) at an controllable depth inside 10 and necessary to adjust the multiplication coefficient k, which determines criticality. It has also an opening 13 through which the propellant is exhausted. Finally appropriate tubing are used to bring in (14) and take out (15) the liquid coolant (e.g. molten Lithium). The temperature of the moderator's cavity determines the average energy of the neutrons.

5.3—The FF-Heating Region

Inside the reflector cavity, a number of heating tubes 16 are located (only one of them is shown in FIG. 19 for clarity), whose structure has already been previously described. The Americium (or other equivalent fuel) 5 in a suitable chemical form, as described above in chapter 3, is deposited on a thin but robust tubular structure 4 (FIG. 5). The same structure (FIG. 5) must also permit the injection by the wall of a capillary flow of hydrogen gas 6, which is exhausted through the open end of the tube 7. Tubes are held firmly in place with the help of a locking structure 17, (which is supposed to unlock in order to remove the tubes for refuelling) to a sturdy holding plate 18, which is firmly anchored to the reflector structure. The structure is very similar to the one of an ordinary reactor, with the tubes replacing the fuel assemblies.

As we shall see further on, the flow of propellant gas, transmitted in the interior of the tubes, is also brought in through the locking structure 17 and travels inside the holding plate 18. The plate 18 separates two main volumes of the engine, the top part 19 in which the tubes are located and which is filled with cooling liquid and the bottom part 20 which is filled with the propellant gas in its way to the throat 21 and the nozzle 22. The base-plate ensures therefore the partition between the cooling liquid on one side and the gas of the stagnation region on the other. The coolant is also used to cool the hot walls in the region 20, with the use of appropriate lining 23. This lining could provide also some hydrogen flow for "transpiration" cooling.

All materials to be used to construct this section must satisfy simultaneously a number of requirements, though to a different extent, depending on the specific function:

5.3.1) Their combined macroscopic absorption neutron cross section must be very small, in order to preserve neutron's transparency inside the moderator's cavity, with the obvious exception of the fissile fuel. The fraction of neutrons absorbed by a given component is roughly proportional to the product (total employed mass)×(thermal cross section). Some consideration should be given also to the possible loss of the neutron during the thermalisation process, for which the relevant cross section is the resonance integral.

5.3.2) They must be able to withstand the radiation damage mainly due to the thermal neutron flux and for the fissile layer also of the FF. Fortunately this last effect is limited by penetration to some 10 mg/cm$^2$ thickness. As pointed out in section 3.4 the radiation damage due to this charged particle flux is of about 30 d.p.a. over the indicated burning, corresponding to one half of the fuel fissioned. The radiation damage of the rest of the engine due to the neutron flux is much smaller, typically of the order of 1 d.p.a.

5.3.3) They must retain good mechanical properties in the temperature range of operation, which has been indicatively set to be of the order of 1,500° K, since much smaller temperatures imply an excessive surface of the radiating panels. They must resist to thermal shocks during operation and have good dimensional stability.

5.3.4) They must be compatible primarily with the propulsion gas (hydrogen) and the refrigerating liquid (molten Lithium). The fuel layer must have an excellent adhesion to the supporting medium. Lack of compatibility could be resolved with the help of suitable coating layers.

5.3.5) They must minimise the associated weight, which is a primary concern in any airborne application.

Amongst the possible choices of the main material constituent of the engine, the use of composite carbon fibres and matrix will be discussed in some detail. These materials, which are relatively new, are in continuous development and are of rapidly improving performance. The development work performed in the so-called ITER project which relates to thermonuclear fusion, and in particular for a critical component called "divertor", is of interest, since it is simultaneously exposed to (i) intense neutron irradiation, (ii) high temperature and temperature shocks and (iii) the presence of a hot hydrogen plasma. The requirements are therefore quite close to the ones of the present application.

As an example, we list in Table 4 the properties of a composite material made of carbon fibres developed for ITER. This product has been tested under neutron irradiation in the range 0.8÷5 d.p.a. and at the temperature of 1,500° C., which are our requirements. The results are extremely promising:

5.3.1) dimensional variations are small, typically of the order of 0.1÷0.2%.

5.3.2) thermal conductivity, although somewhat affected at low temperatures (a loss factor of 0.75÷0.8 at 800° C.) remains unaffected above 1,000° C., due to annealing due to absorption of the radiation induced defects favoured by the high temperature.

5.3.3) The effects of irradiation on thermal expansion are very small. Incidentally, we note that the thermal expansion of the material is very small, typically one order of magnitude smaller than the one of metallic alloys used in similar conditions.

5.3.4) Irradiation improves the Young modulus, with an increment of about 30÷40% after 1 d.p.a. This effects is coupled with an improvement of the Young modulus and of the rupture stress with temperature (+15% at 1,500° C.).

TABLE 4

Exemplifying properties of carbon fibre compounds (X, Y, Z) developed for ITER.

| SEP NB31 | | X | Y | Z | |
|---|---|---|---|---|---|
| Sublimation temperature | 3,600 | | | | ° C. |
| Density | 1.90 | | | | g/cm$^3$ |
| Thermal expansion | | 0.4 | 1 | 2.1 | $10^{-6}$/° K. |
| Thermal Conductivity | | 154 | 58 | 55 | W · m$^{-1}$ · ° K.$^{-1}$ |
| Young Modulus | | 107 | 20 | 12 | GPa |
| Rupture stress | | 130 | 30 | 19 | GPa |

In general at the temperatures projected for our application, the effects due to neutron irradiation are small and the material retains in practice all the main properties of non-irradiated samples.

Therefore, it seems appropriate to construct the FF heating tubes out of composite carbon fibres and matrix. Another relevant property of these materials is the fact that the compound is porous and permeable to hydrogen (This has also been studied in connection with the ITER project). These features are strongly dependent on the details of the compound and permeability may be varied over many orders of magnitude with the help of specific processes of local compacting or doping. In our case this feature has two important applications:

5.3.5) It allows to introduce the propellant (hydrogen) in the FF heating tubes. It has been verified numerically that a slab of a few millimeter thickness with a limited number of narrow, hollow channels in which hydrogen is introduced under pressure can provide the necessary supply rate of propellant, should be of the order of 1 g/s/m$^2$. The use of a suitable barrier/coating prevents the leaking of the gas through the outer layer of the tube into the liquid coolant. The principle diagram of the "leaky" wall of the tube is shown in FIG. 21.

5.3.6) It permits to cool to an acceptable temperature the chamber walls and the throat, exposed to very hot gas, by the so-called convection transpiration cooling.

Figure 21:
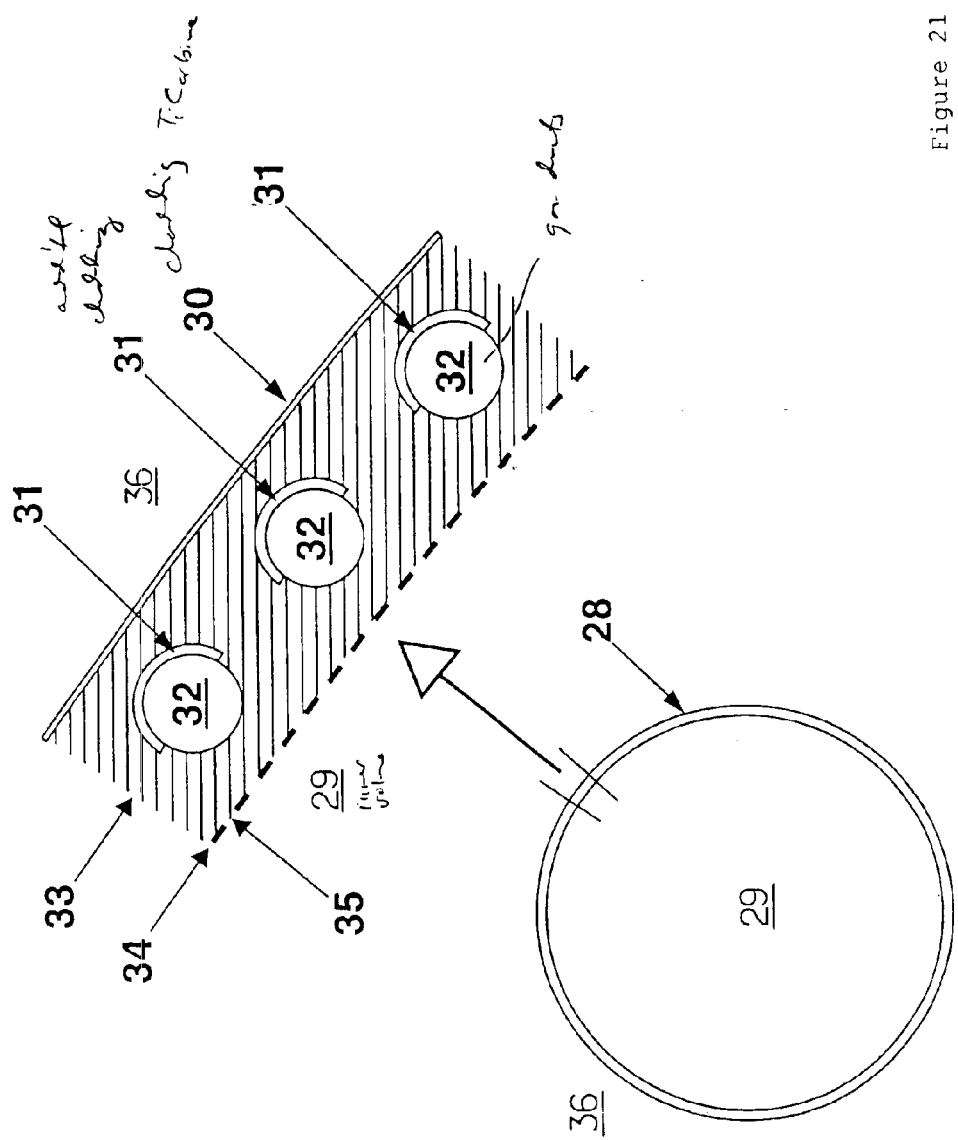
FIG. 21 is a principle diagram of a "leaky" wall of the tube. A small slice of the circular section of the tube 28 is shown. The inner volume 29 of the tube is filled with gas, while the tube is immersed in the coolant 36.

The details of an exemplifying tube structure are shown in FIG. 21, where a small slice of the circular section of the tube 28 is shown. The inner volume 29 of the tube is filled with gas, while the tube is immersed in the coolant 36. The tube is made of a carbon matrix, with an appropriate orientation of the fibres 33 and it is porous to the gas, which is supplied through a plurality of thin ducts 32 provided within the tube wall. A metallic cladding 30 covers the outer surface of the tubes to prevent the gas from escaping to the coolant region. This cladding 30 is also used to ensure compatibility with the coolant liquid. It can be made of Titanium carbide, for instance. Additional cladding 31 inside the tube walls, on the portions of the gas supply ducts 32 oriented towards the tube exterior, may help directing the gas flow in the direction of the tube inner volume 29. The fuel deposited on the inner wall of the tube 34 may be striped, with many small slits 35 which permit the gas to exit into the tube, although the permeability of the thin deposit to hydrogen is very high and even a uniform but very thin layer will constitute no barrier to the gas flow.

The chemical compatibility of the composite carbon fibres and matrix with hydrogen: it has been studied and although at lower temperatures there is the possibility of $CH_4$ formation, such an effect is strongly attenuated at high temperatures. Injection of such eventually formed small amount of $CH_4$ in the FF heating chamber should be harmless, while the erosion effects on the composite material is expected to be negligible. On the other hand, in a hydrogen rich environment, oxidation is strongly prevented.

Regarding the chemical compatibility of carbon with Lithium, two effects have to be considered:

5.3.7) Formation of a carbide ($Li_2C_2$).

5.3.8) Solubility of carbon in the molten metal with complex transport phenomena.

5.3.9) Swelling of the material due to penetration of the molten metal inside the composite.

All these effects need to be investigated, before allowing a direct contact between the coolant and the carbon fibres. However this contact may be eliminated since, as visible from FIG. 21, in order to avoid hydrogen leaking into the coolant, an appropriate surface cladding 30 is used on the outer surface of the tubes, which further ensures the separation between the coolant and the composite carbon material. An excellent material for this cladding is Titanium Carbide.

To conclude, the general layout of the FF heating region consists of a relatively large number of tubes, made of carbon composite immersed in a low pressure cooling bath. This is reminiscent of the structure of a ordinary reactor, with the hollow tubes replacing the fuel rods and assemblies.

In this analogy there is a strong supporting baseline plate in which these tubes are plugged. Single tubes are removable for refuelling and the fitting joint to the plate ensures mechanical support as well as the supply of hydrogen. Tubes are only held by the locating base-plate, being otherwise free.

Additional refuelling, in analogy to a reactor is performed by extracting the tubes from the holding plate, once the top cover of the reflector has been removed and in absence of the cooling liquid. The fuel extraction procedure can be performed from the top cover of the moderator's cavity with techniques customary of ordinary reactors, e.g. with a pair of rotating cover plates.

Evidently more complex arrangements are possible. For instance groups of tubes could be arranged in sub-units (fuel bundles) which are separately removed as blocks during refuelling in space. Each of these sub-units could have its own gas expansion and exhaust nozzle. Evidently, all the sub-units of the engine are located inside a single reflector volume.

5.4—The Gas Expansion and Exhaust Region

Referring again to FIG. 19, the hot gas from the tubes is collected in the stagnation region 20. This part is very similar to the one of an ordinary chemical rocket engine, except that the stagnation temperature is much higher (for instance 9,500° K and atomic H in our case, versus 3,500° K and stoichiometric mixture of $H_2$ and $O_2$ for a liquid H/O chemical engine). The pressure in the engine is maintained to the prescribed value by a narrow hole 21, the throat, through which the gas escapes to an expansion cone 22, in which the thermal energy is transformed into gas speed and hence thrust. It is most likely that the gas through the nozzle and in the expansion cone remains atomic hydrogen ("frozen flow"), which has the smallest atomic mass (A=1) and therefore a high specific impulse. The walls of the throat and neighbouring parts are cooled with Lithium 23 and kept at an acceptable temperature by a "pillow" of colder gas by transpiration. The temperature in the expansion cone is ultimately very low, but exothermic conversion atomic→molecular may occur in contact with solid surfaces.

The overall thermodynamical efficiency of the heat-to-thrust conversion is typically 60÷70%.

5.5—The Cooling System

Its function is the one of dissipating into space the heat not converted into propulsion and it is designed in such a way as to be able to dissipate the full nuclear power produced, in case for instance of failure of the gas supply.

This system is coupled to the heat source (the outer walls of the tubes) by the circulating coolant (heat pipe). Therefore the temperature of the tubes is closely related to the temperature at which the heat is radiated, in turn related to the needed surface by the $T_{rad}^4$ dependence of the Stefan law of a black body radiation. The total radiator surface $S_{rad}$ (this is actually the equivalent black-body surface and it is equal to the actual surface times the surface absorption coefficient) is obviously proportional to the total fissile ($^{242m}Am$) surface $S_{foil}$ and strongly dependent on $T_{rad}$:

$$S_{rad} = S_{foil} \frac{dW_{fiss}}{dS_{foil}} \left( \frac{64.81° K.}{T_{rad}} \right)^{1/4}$$

Figure 22:
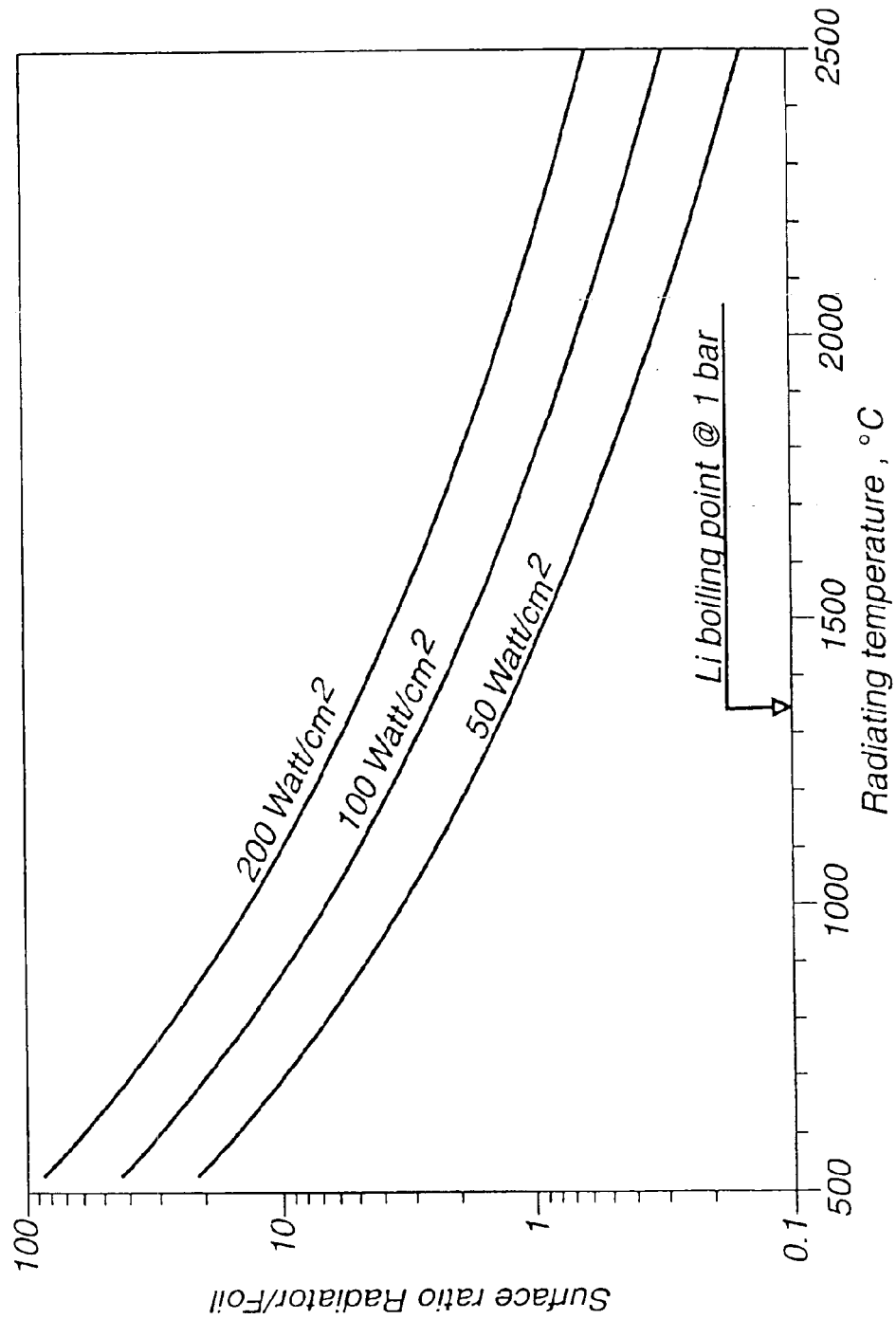
FIG. 22 is a graph showing the ratio of areas of radiator and of heat producing layer as a function of the radiator's temperature in ° C., for different values of the layer specific fission power. The boiling point of Lithium at atmospheric pressure is also indicated.

The actual dependence for typical values of the specific fission power is shown in FIG. 22. It is evident that in order to ensure an effective cooling, the radiator must operate at the highest possible temperature. A good reference value could be the boiling point of Lithium at low pressure (1 bar absolute) corresponding to 1342° C. At this temperature the ratio $S_{rad}/S_{foil}$ is respectively 5.12, 2.56 and 1.28 for $dW_{fiss}/dS_{foil}$=200, 100 and 50 W/cm² which are reasonable values. The latent boiling heat of $Li^7$, which is likely to be exploited for the cooling (boiling reactor concept) is 19.24 kJoule/g (134.7 kJoule/mol) and cooling for instance a 100 MWatt power requires boiling and subsequent condensation of a mere 5.2 kg/s (9.7 liter/s) of coolant. Therefore, for the sake of the qualitative considerations which follow, we shall assume an indicative temperature of the engine of ≧1,500° K.

The temperature of the reflector in the moderator's cavity for practical reasons is likely to be very close to the one of the engine. Therefore, the bulk of the engine will operate at the same temperature.

The elimination of the extra heat is a problem in space. As already pointed out, we assume a molten Lithium coolant at the boiling point with low pressure (the exact pressure will depend on the actual operating temperature). The Lithium is extracted as a vapour and sent to the radiating panels, where it condenses back to liquid form. The latent boiling heat has the relatively high figure of 19.24 kJoule/g. As already pointed out, 100 MWatt power dissipation requires boiling and subsequent condensation of a mere 5.2 kg/s (9.7 liter/s) of coolant.

Figure 23:
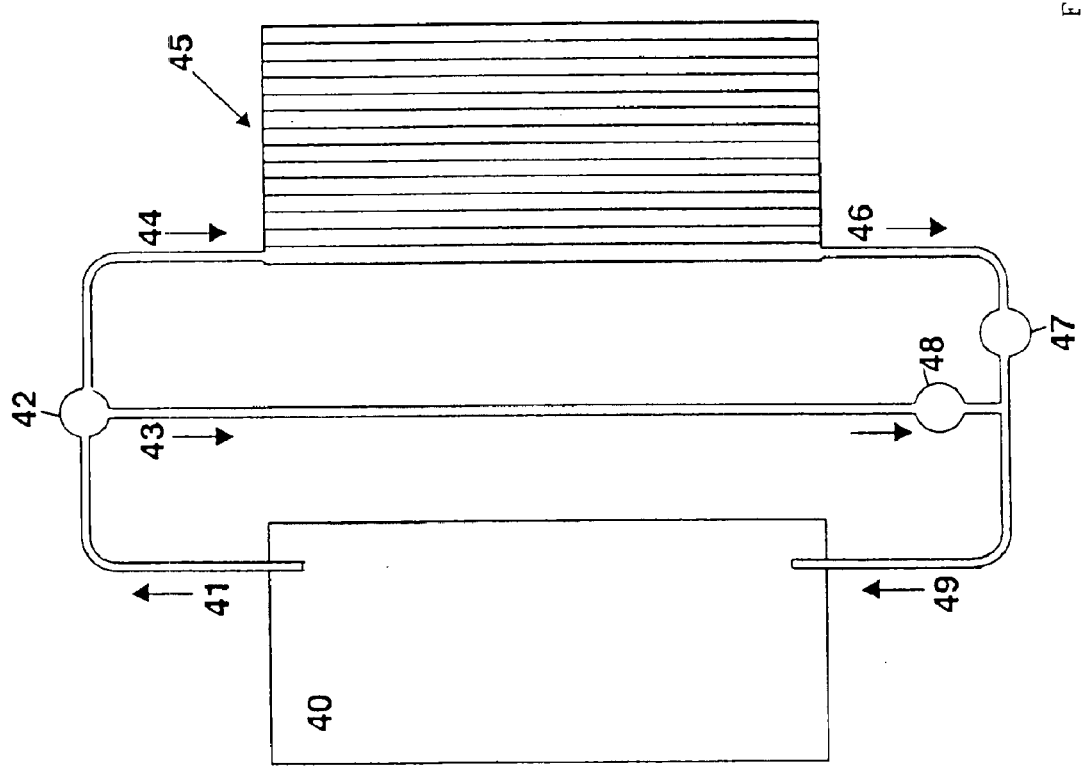
FIG. 23 is a schematic, principle diagram of the cooling system of an engine as illustrated in FIG. 19.

We report in FIG. 23 for illustrative purposes a schematic, principle diagram of the cooling system. The engine volume filled with coolant 40 produces a two-phase, boiling Lithium which is transferred through 41 to a liquid-vapour separator 42. The liquid is transferred along 43 to a pump 48 and re-injected through 49 in the engine's coolant volume 40. The fraction which is vapour is brought through 44 to the radiating panels 45 where it slowly liquefies again. The resulting liquid phase, is brought through 46 to a pump 47 and via the pipeline 49 to the engine cooling volume 40.

A system of radiating panels 45 of such a significant surface is exposed to the risk of puncturing due to bombardment by meteorites. Therefore a fine segmentation of the coolant flow in the panels is required, with special sealing valves to avoid a massive leak into space in the case of an accidental hole.

5.6—Expected Performance of the Heated Gas

In order to transform high temperature heat into thrust, the gas is expanded in the expansion cone, converting the thermal energy (enthalpy) resulting from the gas heating into kinetic thrust energy, with consequent change in the gas composition. At any point, the speed v is determined by energy conservation:

$$v = \sqrt{2(E_{stagn} - E)}$$

the Mach number M and the area A relative to that $A_{throat}$ of the throat region are:

$$M = v\sqrt{\frac{\rho}{\gamma p}} \; ; \; \frac{A}{A_{throat}} = \frac{\rho_{throat}}{\rho} \frac{v_{throat}}{v}$$

Therefore it is possible to calculate for each specified pressure value of the iso-entropically expanding gas along the cone the relevant parameters of the gas, and in particular gas speed, i.e. the specific impulse, either at the exit pressure or when the nozzle exhausts to a perfect vacuum.

A main assumption of the previous calculation is the existence of chemical equilibrium of the gas throughout the expanding nozzle. If this assumption is now relaxed, two recombination reactions are relevant toward maintaining the thermodynamical equilibrium in the cool-down process:

5.6.1) Recombination of electron plasma into neutral atoms. The primary reaction is $p+e^- \rightarrow H^\circ + \gamma$, namely the inverse process of the photo-ionisation. This process is not of relevance since for $T_\infty 9{,}500^\circ$ K the amount of ionisation is very small.

5.6.2) Recombination of neutral atoms into molecules, namely $H^\circ + H^\circ \rightarrow H_2$. This reaction, as written here, is not cinematically possible, since one cannot conserve immediately both energy and momentum. Therefore this form of recombination can only occur through higher order processes involving (1) simultaneous collisions with many bodies like for instance $3H^\circ \rightarrow H^\circ + H_2$ requiring a higher pressure, or (2) with the emission of a photon or, more likely, of an Auger electron $H^\circ + H^\circ \rightarrow H_2 + \gamma(e)$. However the threshold for this latter reaction (2) is the ionisation potential and it is far beyond the typical energies involved.

Therefore it is very likely that this recombination will remain "frozen" at least at relatively low pressures and that the engine's propulsion will be achieved primarily through the emission of neutral hydrogen atoms. Therefore the calculation has been repeated for a gas in which the atomic state delivered by the throat, conservatively at temperature above recombination, is preserved throughout the motion in the expansion cone.

Figure 24:
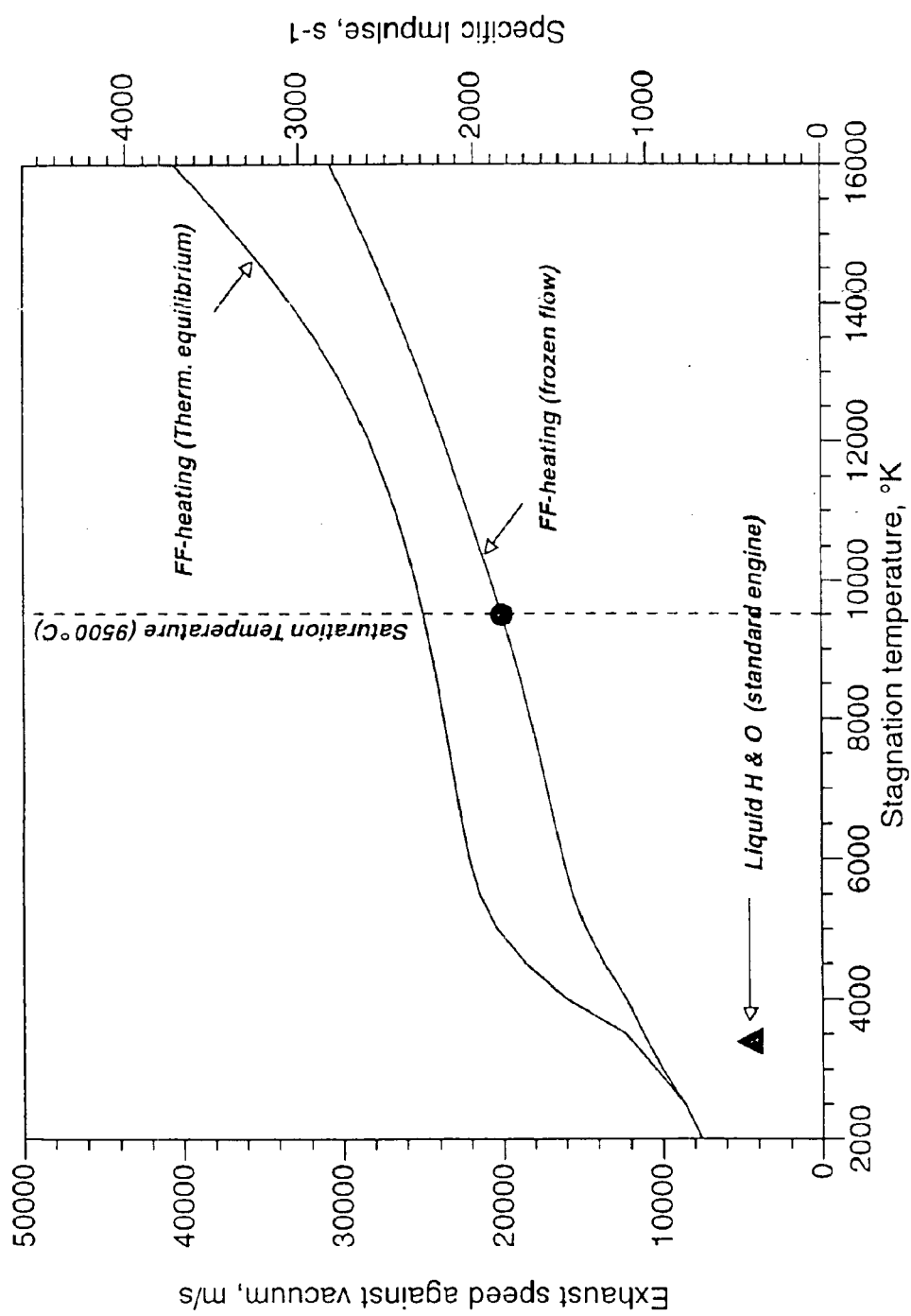
FIG. 24 is a graph showing the exhaust speed and specific impulse for an optimised exhaust cone in the 1-D approximation as a function of the stagnation temperature. The upper curve corresponds to adiabatic equilibrium with complete recombination while the lower curve assumes no recombination. The stagnation pressure is 6 atm.

The exhaust speed and the specific impulse against vacuum in the assumption of chemical equilibrium and of fully "frozen" flow for the stagnation pressure of 6 atm are plotted in FIG. 24, as a function of the stagnation temperature. As already pointed out the expected stagnation temperature is $9{,}500^\circ$ K.

The loss of performance with atomic hydrogen propulsion is not as large as one might have anticipated. Indeed, although the exothermic recombination reaction into hydrogen molecules is absent, the average A of the emitted gas is halved with respect to molecular hydrogen, thus increasing the speed and consequently the specific impulse by a factor $\sqrt{2}=1.41$, which is appreciable. At the stagnation temperature of $9{,}300 \div 9{,}400^\circ$ K, radiation limited, we obtain a frozen flow with a specific impulse $I_{sp}=2{,}000$ sec, to be compared with $I_{sp}=2{,}540$ sec for full recombination (an improvement of 24%) and $I_{sp}=430$ sec of the best chemical engines.

The atomic hydrogen flow is very cold ($220^\circ$ K, when compared to $2{,}300^\circ$ K with full recombination) which represents an advantage in the design of the expansion cone. It must be remarked however that recombination may occur quickly in contact with walls, which can provide for the missing momentum balance necessary for the occurrence of the reaction. This is a well known effect, on which the so-called "plasma torch" is based. Prompt recombination produces abundant heat in contact with the solid surfaces, which might eliminate the above-mentioned advantage of a low gas temperature.

What is claimed is:

1. A space engine comprising a gas heating device, wherein said gas heating device includes:
at least one chamber for containing gas, delimited by a wall having a front face coated with fissile material and a rear face, and
means for cooling the rear face of the wall of said chamber, wherein the fissile material on the front face of the chamber wall is in direct contact with gas circulating through said chamber, the space engine further comprising means for expelling the heated gas from the chamber into space to generate thrust.

2. A space engine according to claim 1, wherein the heated gas comprises hydrogen.

3. A space engine according to claim 1, wherein the heated gas comprises at least one component selected from the group consisting of carbon dioxide, helium and argon.

4. A space engine according to claim 1, wherein the at least one chamber and the fissile material coating are arranged to induce fission in critical conditions.

5. A space engine according to claim 1, wherein the fissile material coating has a fissile content lower than 10 mg/cm$^2$.

6. A space engine according to claim 1, wherein the fissile material comprises $^{242m}$Am as a fissile isotope.

7. A space engine according to claim 6, wherein the fissile material is in the form of a carbide.

8. A space engine according to claim 1, wherein the fissile material comprises $^{233}$U, $^{235}$U or $^{239}$Pu as a fissile isotope.

9. A space engine according to claim 8, wherein the fissile material is in the form of a carbide.

10. A space engine according to claim 1, further comprising a neutron reflector surrounding an enclosure in which said at least one chamber is located.

11. A space engine according to claim 10, wherein the neutron reflector comprises carbon, beryllium or beryllium oxide.

12. A space engine according to claim 10, wherein the neutron reflector comprises a thickness of carbon material surrounding the enclosure, said thickness, in cm, I being at least 50/d, where d is the density of said carbon material expressed in g/cm$^3$.

13. A space engine according to claim 10, wherein the neutron reflector has cavities for receiving removable neutron-absorbing control rods.

14. A space engine according to claim 10, wherein a plurality of chambers are arranged in the enclosure surrounded by the neutron reflector for receiving the heated gas.

15. A space engine according to claim 10, wherein the means for expelling the heated gas comprise an exhaust nozzle, and said at least one chamber is in communication with said exhaust nozzle through a throat provided in the neutron reflector.

16. A space engine according to claim 15, wherein the enclosure has a fuel region where said at least one chamber is located, and a hot gas collecting region between the fuel region and the throat, wherein a cooling medium is circulated in a circuit having a first portion on a face of the neutron reflector adjacent to the hot gas collect-region and a second portion located in the fuel region and separated from the hot gas collecting region by a partition having an aperture in which an open end of the coated chamber wall is inserted, and wherein the coated chamber wall separates the chamber from said second portion of the cooling circuit inside the fuel region.

17. A space engine according to claim 16, wherein a molten metal is used as said cooling medium.

18. A space engine according to claim 17, wherein said molten metal comprises $^7$Li.

19. A space engine according to claim 1, wherein said at least one chamber has a tubular shape.

20. A space engine according to claim 1, wherein the wall of said at least one chamber is made of a porous material, and further comprising means for introducing the gas into the chamber through pores of the porous wall material.

21. A space engine according to claim 20, wherein said porous material is a carbon material.

22. A space engine according to claim 20, wherein a gas-tight layer is coated on the rear face of the chamber wall, to direct the gas introduced through the pores of the porous wall material towards the inside of the chamber.

23. A space engine according to claim 1, wherein the means for cooling the chamber wall include a molten metal used as a cooling medium.

24. A space engine according to claim 23, wherein said molten metal comprises $^7$Li.

25. A gas heating device, comprising:
at least one open chamber having a wall, said wall having a front face coated with fissile material comprising $^{242m}$Am as a fissile isotope, and a rear face;
inlet means for introducing gas into the chamber;
outlet means for evacuating gas circulated through said chamber from the inlet means; and
means for cooling the rear face of the wall of said chamber, wherein the fissile material on the front face of the chamber wall is in direct contact with the gas circulating through said chamber.

26. A device according to claim 25, wherein the at least one chamber and the fissile material coating are arranged to induce fission in critical conditions.

27. A device according to claim 25, wherein the fissile material coating has a fissile content lower than 10 mg/cm$^2$.

28. A device according to claim 25, wherein the fissile material is in the form of a carbide.

29. A device according to claim 25, wherein said at least one chamber has a tubular shape.

30. A device according to claim 25, wherein said inlet means comprise a porous material of which the wall of said at least one chamber is made, the gas being introduced into the chamber through pores of the porous wall material.

31. A device according to claim 30, wherein said porous material is a carbon material.

32. A device according to claim 30, wherein said inlet means further comprise a gas-tight layer coated on the rear face of the chamber wall, to direct the gas introduced through the pores of the porous wall material towards the inside of the chamber.

33. A device according to claim 25, wherein the means for cooling the chamber wall include a molten metal used as a cooling medium.

34. A device according to claim 25, wherein said molten metal comprises $^7$Li.

35. A gas heating device, comprising:
at least one open chamber having a wall, said wall having a front face coated with fissile material and a rear face;
inlet means for introducing gas into the chamber, comprising a porous material of which the wall of said at least one chamber is made, the gas being introduced into the chamber through pores of the porous wall material;
outlet means for evacuating gas circulated through said chamber from the inlet means; and
means for cooling the rear face of the wall of said chamber, wherein the fissile material on the front face of the chamber wall is in direct contact with the gas circulating through said chamber.

36. A device according to claim 35, wherein the at least one chamber and the fissile material coating are arranged to induce fission in critical conditions.

37. A device according to claim 35, wherein the fissile material coating has a fissile content lower than 10 mg/cm$^2$.

38. A device according to claim 35, wherein said porous material is a carbon material.

39. A device according to claim 35, wherein said inlet means further comprise a gas-tight layer coated on the rear face of the chamber wall, to direct the gas introduced through the pores of the porous wall material towards the inside of the chamber.

40. A device according to claim 35, wherein the means for cooling the chamber wall include a molten metal used as a cooling medium.

41. A device according to claim 40, wherein said molten metal comprises $^7$Li.

42. A gas heating device, comprising:
at least one open chamber having a wall, said wall having a front face coated with fissile material and a rear face;
inlet means for introducing gas into the chamber;
outlet means for evacuating gas circulated through said chamber from the inlet means; and
means for cooling the rear face of the wall of said chamber, including a molten metal used as a cooling medium,
wherein the fissile material on the front face of the chamber wall is in direct contact with the gas circulating through said chamber.

43. A device according to claim 41, wherein said molten metal comprises $^7$Li.

44. A device according to claim 42, wherein the at least one chamber and the fissile material coating are arranged to induce fission in critical conditions.

45. A device according to claim 42, wherein the fissile material coating has a fissile content lower than 10 mg/cm$^2$.

46. A device according to claim 45, wherein the fissile material coating has a fissile content in the range from 1 to 3 mg/cm$^2$.

47. A space engine according to claim 5, wherein the fissile material coating has a fissile content in the range from 1 to 3 mg/cm$^2$.

48. A device according to claim 27, wherein the fissile material coating has a fissile content in the range from 1 to 3 mg/cm$^2$.

49. A device according to claim 37, wherein the fissile material coating has a fissile content in the range from 1 to 3 mg/cm$^2$.

50. A device according to claim 25, further comprising a neutron reflector surrounding an enclosure in which said at least one chamber is located.

51. A device according to claim 50, wherein the neutron reflector comprises carbon, beryllium or beryllium oxide.

52. A device according to claim 50, wherein the neutron reflector comprises a thickness of carbon material surrounding the enclosure, said thickness, in cm, being at least 50/d, where d is the density of said carbon material expressed in g/cm$^3$.

53. A device according to claim 50, wherein the neutron reflector has cavities for receiving removable neutron-absorbing control rods.

54. A device according to claim 50, wherein a plurality of chambers are arranged in the enclosure surrounded by the neutron reflector for receiving the heated gas.

55. A device according to claim 50, wherein said outlet means are in communication with an exhaust nozzle through a throat provided in the neutron reflector.

56. A device according to claim 55, wherein the enclosure has a fuel region where said at least one chamber is located, and a hot gas collecting region between the fuel region and the throat, wherein a cooling medium is circulated in a circuit having a first portion on a face of the neutron reflector adjacent to the hot gas collecting region and a second portion located in the fuel region and separated from the hot gas collecting region by a partition having an aperture in which an open end of the coated chamber wall is inserted, and wherein the coated chamber wall separates the chamber from said second portion of the cooling circuit inside the fuel region.

57. A device according to claim 56, wherein a molten metal is used as said cooling medium.

58. A device according to claim 57, wherein said molten metal comprises $^7$Li.

59. A device according to claim 35, further comprising a neutron reflector surrounding an enclosure in which said at least one chamber is located.

60. A device according to claim 59, wherein the neutron reflector comprises carbon, beryllium or beryllium oxide.

61. A device according to claim 59, wherein the neutron reflector comprises a thickness of carbon material surrounding the enclosure, said thickness, in cm, being at least 50/d, where d is the density of said carbon material expressed in g/cm$^3$.

62. A device according to claim 59, wherein the neutron reflector has cavities for receiving removable neutron-absorbing control rods.

63. A device according to claim 59, wherein a plurality of chambers are arranged in the enclosure surrounded by the neutron reflector for receiving the heated gas.

64. A device according to claim 59, wherein said outlet means are in communication with an exhaust nozzle through a throat provided in the neutron reflector.

65. A device according to claim 55, wherein the enclosure has a fuel region where said at least one chamber is located, and a hot gas collecting region between the fuel region and the throat, wherein the means for cooling comprise a cooling medium circulated in a circuit having a first portion on a face of the neutron reflector adjacent to the hot gas collecting region and a second portion located in the fuel region and separated from the hot gas collecting region by a partition having an aperture in which an open end of the coated chamber wall is inserted, and wherein the coated chamber wall separates the chamber from said second portion of the cooling circuit inside the fuel region.

66. A device according to claim 42, further comprising a neutron reflector surrounding an enclosure in which said at least one chamber is located.

67. A device according to claim 66, wherein the neutron reflector comprises carbon, beryllium or beryllium oxide.

68. A device according to claim 66, wherein the neutron reflector comprises a thickness of carbon material surrounding the enclosure, said thickness, in cm, being at least 50/d, where d is the density of said carbon material expressed in g/cm$^3$.

69. A device according to claim 66, wherein the neutron reflector has cavities for receiving removable neutron-absorbing control rods.

70. A device according to claim 66, wherein a plurality of chambers are arranged in the enclosure surrounded by the neutron reflector for receiving the heated gas.

71. A device according to claim 66, wherein said outlet means are in communication with an exhaust nozzle through a throat provided in the neutron reflector.

72. A device according to claim 71, wherein the enclosure has a fuel region where said at least one chamber is located, and a hot gas collecting region between the fuel region and the throat, wherein the means for cooling comprise a cooling medium circulated in a circuit having a first portion on a face of the neutron reflector adjacent to the hot gas collecting region and a second portion located in the fuel region and separated from the hot gas collecting region by a partition having an aperture in which an open end of the coated chamber wall is inserted, and wherein the coated chamber wall separates the chamber from said second portion of the cooling circuit inside the fuel region.

* * * * *

UNITED STATES PATENT AND TRADEMARK OFFICE
CERTIFICATE OF CORRECTION

PATENT NO. : 6,876,714 B2 Page 1 of 1
APPLICATION NO. : 09/782558
DATED : April 5, 2005
INVENTOR(S) : Carlo Rubbia It is certified that error appears in the above-identified patent and that said Letters Patent is hereby corrected as shown below:

Please make the following corrections: Title Page

(73) Assignees: Carlo Rubbia (CH):
                   Enea (Ente per le Nuove Tecnologie L'Energia e L'Ambiente) (IT).

Signed and Sealed this

Eighteenth Day of July, 2006

JON W. DUDAS
*Director of the United States Patent and Trademark Office*